(12) United States Patent
Foulger et al.

(10) Patent No.: US 6,578,022 B1
(45) Date of Patent: Jun. 10, 2003

(54) INTERACTIVE INTELLIGENT SEARCHING WITH EXECUTABLE SUGGESTIONS

(75) Inventors: Michael G. Foulger, Novato, CA (US); Matthew J. Gaul, Petaluma, CA (US)

(73) Assignee: icPlanet Corporation, San Jose, CA (US)

( * ) Notice: Subject to any disclaimer, the term of this patent is extended or adjusted under 35 U.S.C. 154(b) by 0 days.

(21) Appl. No.: 09/551,533

(22) Filed: Apr. 18, 2000

(51) Int. Cl.[7] .................................................. G06N 5/00
(52) U.S. Cl. .............................. 706/45; 706/46; 706/11; 707/104; 707/10; 707/3
(58) Field of Search ............................. 706/45, 46, 11; 707/104, 10, 3

(56) References Cited

U.S. PATENT DOCUMENTS 5,832,497 A * 11/1998 Taylor ............................ 705/1

* cited by examiner

Primary Examiner—Thomas Black
Assistant Examiner—Joseph P. Hirl
(74) Attorney, Agent, or Firm—Sterne, Kessler, Goldstein & Fox P.L.L.C.

(57) ABSTRACT

A method, system, and computer program product for interactive searching with executable suggestions are provided. The present invention provides a search engine and data management technology that can understand what users are looking for, understand the data in a database, and present immediately useful suggestions for finding the right information. Executable suggestions are presented that enable a user to further narrow or broaden a search intelligently and adaptively in real-time. Each executable suggestion describes a search and corresponding search criteria and provides information on the actual search results a user will obtain according to this search criteria. In one embodiment of the present invention, a system has a suggestion engine and one or more suggestion spaces.

12 Claims, 16 Drawing Sheets

ic.spider results

NEW ACCOUNT | SEARCH | JOB POST | RESOURCES | JOB LOG | HELP
SEARCH OPTIONS    SMART SEARCH    icSPIDER

ICSPIDER FOUND 928 MATCHES. DISPLAYING RECORDS 1 TO 11.
YOU ASKED FOR:
JOB CATEGORY: INFORMATION TECHNOLOGY: DBAs

THIS SPIDER CAN CONTINUE TO SEARCH THE INTERNET FOR THE OTHER QUALIFIED CANDIDATES. GO SPIDER

SMART TIPS

IS THIS TOO FEW?
DID YOU KNOW THAT MANY PROGRAMMERS KNOW SQL TOO? EXPAND MY SEARCH
DID YOU KNOW THAT MANY DATABASE DESIGNERS KNOW SQL TOO? EXPAND MY SEARCH

IS THIS TOO MANY?
DID YOU KNOW THAT 14 OF THE DBA'S IN THIS LIST ARE ORACLE SPECIALISTS? NARROW MY SEARCH
DID YOU KNOW THAT 12 OF THE DBA'S IN THIS LIST HAVE OVER 10 YEARS OF EXPERIENCE? NARROW MY SEARCH

| NAME | RELEVANCE | CATEGORY | YRS EXP | LOCATION |
|---|---|---|---|---|
| R. | ▭ | INFORMATION TECHNOLOGY: DBAs | | AUSTIN, TX |
| S. | ▭ | INFORMATION TECHNOLOGY: DBAs | | FREMONT, CA |
| J. | ▭ | INFORMATION TECHNOLOGY: DBAs | | SHREVEPORT, LA |
| O. | ▭ | INFORMATION TECHNOLOGY: DBAs | 1 | BOZEMAN, MT |
| A. | ▭ | INFORMATION TECHNOLOGY: DBAs | | SAN JOSE, CA |
| C. | ▭ | INFORMATION TECHNOLOGY: DBAs | | SHERWOOD, AR |
| D. | ▭ | INFORMATION TECHNOLOGY: DBAs | | CHICAGO, IL |
| C. | ▭ | INFORMATION TECHNOLOGY: DBAs | 3 | MEXICO CITY> CIUDAD DE, |
| B. | ▭ | INFORMATION TECHNOLOGY: DBAs | | FREMONT, CA |
| a. | ▭ | INFORMATION TECHNOLOGY: DBAs | | CHICAGO, IL |

GO BACK | NEW SEARCH | NEXT home  my account  search  job post  job log  resources  help

FIG.6 icplanet

| SEARCH OPTIONS | NEW ACCOUNT | SEARCH | JOB POST | RESOURCES | JOB LOG |
| --- | --- | --- | --- | --- | --- |
| | | SMART SEARCH | icSPIDER | | | ic.spider

CREATE A PROFILE OF YOUR IDEAL INDEPENDENT CONTRACTOR (IC). WHEN YOU'RE DONE, WE'LL SEARCH THE WEB FOR ICs WHO MOST CLOSELY MATCH YOUR IDEAL.

1 SELECT YOUR TOP SEARCH CRITERIA.
2 ANSWER CUSTOMIZED QUESTIONS.

A) SELECT A CATEGORY FOR THE CONTRACT JOB YOU WISH TO FILL:

[ANY ▽]

B) SELECT ANY OF THESE CRITERIA THAT ARE IMPORTANT TO YOUR CURRENT SEARCH FOR AN INDEPENDENT CONTRACTOR:

☐ SKILLS
☐ AVAILABILITY FOR CURRENT ASSIGNMENT
☐ POSSIBLE FUTURE CONVERSION TO PERMANENT EMPLOYEE
☐ EDUCATION
☐ EXPERIENCE: ALL RELEVANT WORK

☐ LEGAL AUTHORIZATION TO WORK IN YOUR COUNTRY
☐ CAN SUPPORT INDEPENDENT CONTRACTOR CLASSIFICATION
☐ LOCATION
☐ PAYMENT TERMS
☐ PROFESSIONAL ASSOCIATIONS

[NEXT]

home   my account   search   job post   job log   resources   help

FIG. 7A

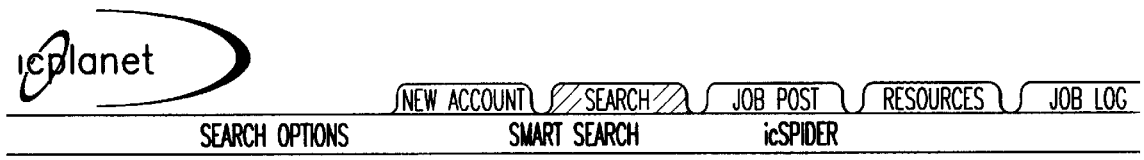

ic.spider

1 SELECT YOUR TOP SEARCH CRITERIA.
2 ANSWER CUSTOMIZED QUESTIONS.

THESE QUESTIONS ARE BASED ON THE GENERAL CRITERIA YOU CHOSE IN STEP 1:

☑ SKILLS
WHICH OF THE FOLLOWING QUALIFICATIONS ARE IMPORTANT IN YOUR CURRENT SEARCH FOR AN INDEPENDENT CONTRACTOR?

EXPERIENCE
- ☐ CLIENT SERVER PROGRAMMER    ☐ DATABASE ADMINISTRATOR
- ☐ NETWORKING                  ☐ SUPPORT
- ☐ SYSTEM ADMINISTRATION

DATA LINK TYPES
- ☐ ATM         ☐ DSL
- ☐ ETHERNET    ☐ FDDI
- ☐ FRAME RELAY ☐ ISDN
- ☐ TOKEN RING

APPLICATION SUITES
- ☐ APPLETALK                    ☐ DEC/DECNET
- ☐ IBM PROTOCOL SUITE           ☐ ISO
- ☐ NOVELL NETWARE PROTOCOL SUITE ☐ TCP/IP
- ☐ UDP                          ☐ XNS
- ☐ X.25

PROTOCOLS
- ☐ FTP   ☐ HTTP
- ☐ NTP   ☐ NNTP
- ☐ POP   ☐ SNMP
- ☐ SMTP

NETWORK APPLICATIONS
- ☐ APACHE       ☐ ARCHIE
- ☐ BIND         ☐ COLDFUSION
- ☐ DHCP SERVER  ☐ GOPHER

FIG. 7B

- ☐ EXCHANGE SERVER
- ☐ MAJORDOMO
- ☐ NIS/NIS +
- ☐ SENDMAIL
- ☐ IIS
- ☐ NETSCAPE ENTERPRISE SERVER
- ☐ OS X SERVER
- ☐ SUN INTERNET MAIL SERVER

PROGRAMMING AND SCRIPTING LANGUAGES
- ☐ C
- ☐ PERL
- ☐ JAVASCRIPT
- ☐ COBOL
- ☐ HTML
- ☐ XML
- ☐ SQL
- ☐ C++
- ☐ JAVA
- ☐ VISUAL BASIC
- ☐ FORTRAN
- ☐ DHTML
- ☐ VRML
- ☐ PHP

DATABASES
- ☐ MYSQL
- ☐ INFORMIX
- ☐ SYBASE
- ☐ ORACLE
- ☐ ACCESS
- ☐ SQL SERVER

OPERATING SYSTEMS
- ☐ NETWARE
- ☐ WINDOWS 98/2000
- ☐ MACINTOSH OS X
- ☐ NETBSD
- ☐ AIX
- ☐ SOLARIS
- ☐ HPUX
- ☐ UNIX (OTHER)
- ☐ WINDOWS NT
- ☐ MACINTOSH
- ☐ BSDI
- ☐ SCO
- ☐ LINUX
- ☐ FREE BSD
- ☐ VMS
- ☐ CISCO IOS

[GO BACK] [NEW SEARCH]

home   my account   search   job post   job log   resources   help

FIG. 7C

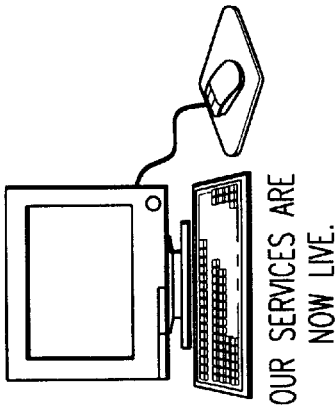
FIG. 8

SEASIDE REALTY

OUTER BANKS NORTH CAROLINA

YOU MAY NOW SEARCH FOR HOMES BASED ON ACTUAL AVAILABILITY FOR THE TIME YOU WANT!

PLEASE SELECT THE FEATURES YOU'RE LOOKING FOR IN YOUR VACATION RENTAL. WHEN YOU HAVE ENTERED ALL YOUR REQUIREMENTS, PRESS THE SUBMIT BUTTON AND WE WILL DISPLAY A LIST OF PROPERTIES THAT MEET YOUR NEEDS. IF YOU PREFER, YOU MAY ALSO BROWSE OUR PROPERTIES ALPHABETICALLY. YOU MAY ALSO LOCATE A PROPERTY BY NUMBER.

THE NUMBER OF HOMES THAT MATCH THE AMENITY IS SHOWN IN PARENTHESIS NEXT TO IT.

CHECK AVAILABILITY:

ARRIVAL WEEKEND: [NO PREFERENCE ▽]
(SELECT A FRIDAY DATE TO INDICATE THE WEEKEND YOU WILL BE ARRIVING. AVAILABILITY WILL BE CHECKED FOR ALL FRI, SAT AND SUN ARRIVAL PROPERTIES.)

LENGTH OF STAY: [7 DAYS ▽]

PROPERTY FEATURES:

AREA: [ANY ▽]
NEIGHBORHOOD: [ANY ▽]
LOCATION: [ANY ▽]
MIN. BEDROOMS: [1 ▽]
MIN. FULL BATHS: [1 ▽]
SPECIAL: ☐
(SPECIALS INCLUDE: RATE REDUCTIONS, NEW PROPERTIES, AND LAST MINUTE CANCELLATIONS)

AMENITIES:

POOL: [ANY ▽]
☐ HOT TUB (68)   ☐ JACUZZI (37)
☐ FIREPLACE (84)   ☐ PETS ALLOWED (10)
☐ NON-SMOKING (31)

FIG. 10A

RESULTS:

WOULD YOU LIKE TO SEE THUMBNAIL (SMALL) PHOTOS OF THE PROPERTIES? ☐

IF YOU ARE ELECTING TO HAVE THE THUMBNAILS SHOWN, IT'S A GOOD IDEA TO RESTRICT THE NUMBER OF RESULTS THAT WILL BE SEEN ON ONE PAGE. HOW MANY WOULD YOU LIKE TO SEE? [5 ▽]
(IF YOU DON'T ELECT TO DISPLAY THUMBNAILS, YOU WILL SEE 25 RESULTS PER PAGE)

HOW WOULD YOU LIKE THE RESULTS SORTED? [LOCATION ▽]

[ SUBMIT NEEDS ]   [ CLEAR FIELDS ]

---

NUMERIC SEARCH:

ENTER PROPERTY NUMBER: [                    ]

[ SEARCH ]   [ CLEAR FIELD ]

SEASIDE REALTY
4425 N. CROATAN HWY.
KITTY HAWK, NC 27949
PHONE: (252) 261-5500
EMAIL: INFO@SEASIDEREALTY.COM

| HOME | SEARCH | RENTAL INFO | MAP | WEATHER | CONTACT US |

SELECT A PAGE: [HOME ▽]  [ GO ]

  

EQUAL HOUSING OPPORTUNITY

HOSTED BY VISUAL DATA SYSTEMS

FIG. 10B

INTERACTIVE INTELLIGENT SEARCHING WITH EXECUTABLE SUGGESTIONS

BACKGROUND OF THE INVENTION

1. Field of the Invention

The present invention relates to computer networking and communication, including Web-based communications and commerce.

2. Related Art

The World Wide Web is increasingly becoming the Internet technology relied upon for conducting electronic commerce and communication. The World Wide Web, also called the Web or WWW, has three basic parts: client software, servers and content. Client software runs on a user's computer and, among other things, provides the graphical user-interface through which a user can "browse" or "surf" the Web. Servers (also called Web servers) are computers that provide the content to users through a communication link. Content can be any kind of multimedia, e.g., images, text, animation, motion video, sound, and Java applets.

Communication between a browser and a server is carried out through Hyper Text Transfer Protocol (HTTP), Hyper Text Transfer Protocol-Secure (HTTPS) or other Web-compatible protocol. Web content is primarily transferred in Web documents or files, called Web pages, which are addressed by a Uniform Resource Locator (URL). Web pages are often multi-media hypertext documents written in a HyperText Markup Language (HTML) which supports hyper-linking. Data entry in Web pages allows users to make selections and fill-out template or profiles to facilitate user input. For example, scripts are often run on servers through a Common Gateway Interface (CGI) to implement data entry. Programming languages, such as, Java, are also being extended to support data entry on the Web.

These parts are well-suited for electronic communication and commerce between remote users. Indeed, the popularity and use of the Internet and World Wide Web has increased drarnatically. The number of Web sites and Web pages continues to grow. As the Internet has experienced explosive growth, the amount of information available has reached staggering proportions. But, this seemingly endless excess of information creates one of the most challenging issues on the Internet today. Put simply, the ability to intelligently and reliably connect users to 'just the right information', represents a continuing challenge, and a huge opportunity.

There is currently awide selection ofweb-based 'search engines' to search this information (AltaVista, Excite, InfoSeek, AskJeeves, Northern Light, Google, etc.). Search engines use different ways to try to find information most relevant to user's search query. For example, index-based search engines index Internet documents to facilitate searching. The ever-growing amount makes it difficult to index Internet content. Indeed, some estimate only 15%–20% of Internet information or data is indexed at present. This approach can also be overly literal and can fail to take into account words having a similar meaning to words of a search query. Concept-based search engines rely on a taxonomy (also called a tree) to facilitate searching data but are also limited in their ability to deliver the "right information" sought by a user.

For instance, general-purpose navigational search engines (including index type or concept type search engines) are designed to search the entire Internet, that is, they are meant to help people navigate to locations on the Internet that may contain relevant information. They are not easily used to search subsets of coherent data such as a database of independent contractors and their skill sets. Such search engines generally do not leverage knowledge about data in a database to facilitate search query formulation. Knowledge about data in a database is further not leveraged interactively with a user to facilitate and focus a search in real-time.

Many search engines include some level of search 'intelligence'. The 'intelligence' of intelligent search engines is primarily in the form of natural language algorithms that are used to interpret a question posed by the user. For example, when using AltaVista to pose a search query "How can I find independent contractors that know SQL?" the question is actually interpreted as "find independent contractors know sql". The 20 or more pages of results returned are of two primary forms: 1) Accounting, legal and self-help sites that discuss "hiring contractors", and 2) "finding home improvement contractors"—obviously not a useful result set for a focused search. All of the current search engines return similar results. In addition, once a result set is returned, a user is left alone to formulate additional search queries.

For most people, understanding how to use today's search engines effectively is a non-trivial endeavor. Even with natural language intelligence, and Boolean search criteria (AND, OR, NOT, etc.), the mechanics of developing an effective question to pose to a search engine is at best daunting for most users, and at worst simply beyond their ability. For example, if we were to ask the majority of non-technical users what the term 'Boolean' means, we'd get a very clear idea of why today's search engines have along way to go towards reaching a goal of connecting users with 'just the right information'—most users don't know what a Boolean expression is or how to use one. The fact is that users need help in determining how to form their questions, and they need to understand how the formation of the question can affect the results.

Some search engines provide an indication of how many total hits or records are associated with a search parameter. For example, FIGS. 10A and 10B show an example screen shot from a realty search engine hosted by Seaside realty (downloaded Apr. 13, 2000). The search engine displays the total number of records associated with each particular "Amenities" search parameter. In this way, a user knows for example that selecting a non-smoking parameter in a search will yield at most 31 records or "hits" while selecting a Hot Tub amenity will yield at most 68 records. This information is helpful, but limited. Users typically wish to formulate queries involving multiple search parameters and/or Boolean parameters. This indication is also based on the total records not the results of an actual search. This display of total records is predetermined for all searchers and search queries, and is not generated adaptively in response to a specific user query. Such predetermined displays put an additional burden on users who must read each search parameter including irrelevant parameters and guess how their search might be impacted.

In sum, problems exist in finding the right information sought by users on the Internet. Most search engines are meant to search the entire Internet-they cannot easily be coerced into searching subsets of related data in intelligent ways. Natural language and Boolean operators are useful, but they are not actually helpful to most non-technical users—users need help in forming their questions. A result set that is typically returned from a natural language search is rarely fully relevant. When a result set is returned by today's search engines, help is not provided to either narrow or broaden the search effectively based on actual search results.

What is needed is a system that can understand what users are looking for, understand the data in a database, and present immediately useful suggestions for finding the right information. Helpful choices or pointers need to be presented to enable a user to further narrow or broaden a search intelligently.

SUMMARY OF THE INVENTION

The present invention provides a search engine and data management technology that can understand what users are looking for, understand the data in a database, and present immediately useful suggestions for finding the right information. Executable suggestions are presented that enable a user to further narrow or broaden a search intelligently and adaptively in real-time. Each executable suggestion describes and encapsulates a change to the original search criteria and provides information on the actual search results a user will obtain according to this search criteria. In this way, a user is provided with insight on consequences of a potential new criteria prior to actually conducting the search and obtaining new search results. A user then adaptively direct a search to the right informnation more quickly and effectively. Selecting an executable suggestion to broaden or narrow a search is also a user-friendly and simple way for a user to further direct a search.

A method, system, and computer program product for interactive, intelligent searching of data elements in a multi-dimensional knowledge base is provided. In one embodiment of the present invention, a system has a suggestion engine and one or more suggestion spaces. Each suggestion space has at least one data structure representative of relationships between data elements for a respective search dimension in the knowledge base. In one example, suggestion tables are used as the data structures. These suggestion tables can represent taxonomies generated by a knowledge expert.

The suggestion engine interrogates the suggestion space based on scope change search criteria. For example, the scope change criteria can indicate whether the suggestion engine is to interrogate for broader or narrower search results. The suggestion engine obtains scope change search results and generates a smart tip that represents the scope change and the number or resulting search results. The smart tip can than be used to display an executable suggestion for a broader and/or narrower search.

In one implementation, data elements in the knowledge base data include job posting and Independent Consulting (IC) profile data. The smart tip includes scope change search criteria, node and search results information. The executable suggestion can be displayed to the user to query the user whether a broader or narrower search is to be executed given the returned node and search results information.

According to one feature, the suggestion space includes suggestion tables stored in the knowledge base and an in-memory suggestion space stored in memory to speed access time. A suggestion space populator and suggestion space updater are also provided to populate and update the content in the in-memory suggestion space.

According to another feature, a suggestion structure builder is coupled between the knowledge base and the suggestion tables. The suggestion structure builder receives an input from a knowledge expert and generates an output to modify the suggestion tables in accordance with the user input. A knowledge base suggestion mapper can also be coupled between the knowledge base and the suggestion tables to convert data between the knowledge base and suggestion tables.

In one implementation, a system is provided that further includes a query builder, a tip formatter, a tip interface, a smart domain module, and a searchable interface.

In one embodiment, a method for interactive searching is provided that includes the steps of receiving a search query. identifying at least one parameter in the search query that corresponds to a dimension in a suggestion space, interrogating the suggestion space to determine scope change search results based on a scope change search criteria, and creating a smart tip that represents the scope change search results, whereby an executable suggestion can be provided to a user based on the smart tip.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art make and use the invention.

FIG. 6 shows an example screen displayed to a user that includes executable suggestions for widening or narrowing a search according to one embodiment of the present invention.

FIGS. 7A, 7B, and 7C show screens served to a hiring manager as part of a search for independent consultants.

FIG. 8 is a diagram of an example Web site portal that can incorporate the present invention.

FIGS. 10A and 10B show an example search screen displayed at a site for a realtor, Seaside realty, that only displays a limited indication of total records (number of matching homes) associated with particular amenities.

The present invention will now be described with reference to the accompanying drawings. In the drawings, like reference numbers indicate identical or functionally similar elements. Additionally, the left-most digit(s) of a reference

DETAILED DESCRIPTION OF THE FIGURES

Table of Contents

Figure 1:
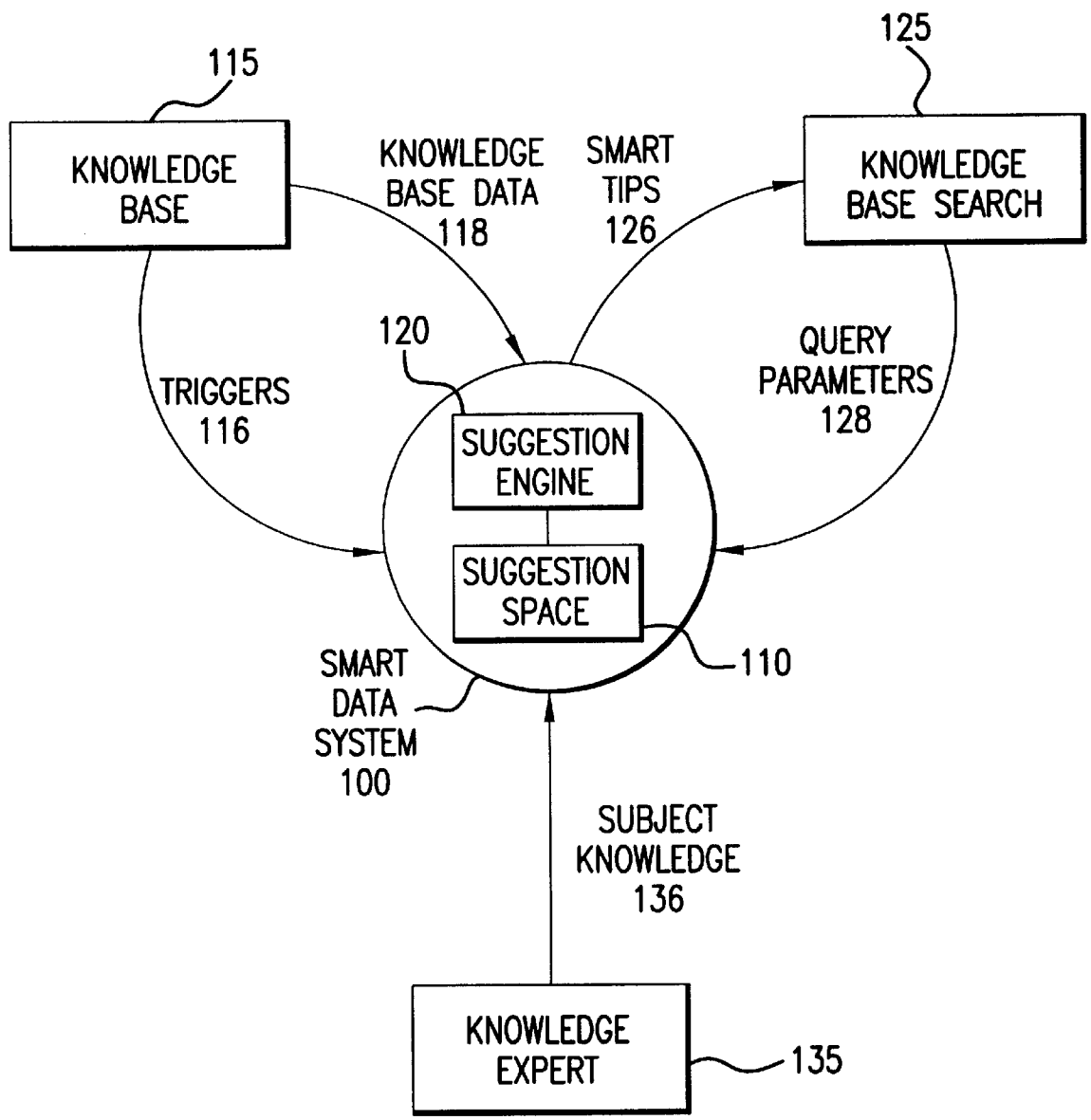
FIG. 1 is a block diagram of an interactive intelligent search and data system according to one embodiment of the present invention.

1. Overview
2. Terminology
3. Finding the Right Information
4. Suggestive Search and Data System
5. Suggestion Space
6. BuildingIMaintaining Suggestion Space
7. Example Suggestion Space Table Designs
8. Suggestion Engine
9. Processing a Search with Smart Tips
10. Smart Tips
11. Example IC Knowledge Base and Application
12. Quick Search, Smart Search, and Guided Search
13. Taxonomy Example
14. Example Network Environment
15. Example Computer System
16. Conclusion 1. Overview The present invention provides a method, system, and computer program product for interactive searching over the World Wide Web (also referred to as WWW or the Web). Search engine and data management technology are provided that can understand what users are looking for, understand the data in a database, and present immediately useful suggestions for finding the right information. Executable suggestions are presented that enable a user to further narrow or broaden a search intelligently and adaptively in real-time. Each executable suggestion describes a possible search and corresponding search criteria and provides information on the actual search results a user will obtain according to this search criteria. In this way, a user is provided with insight on consequences of a potential new criteria prior to actually conducting the search and obtaining complete search results. A user then adaptively direct a search to the right information more quickly and effectively. Selecting an executable suggestion to broaden or narrow a search, is also a user-friendly and a simple way for a user to further direct a search.

The present invention is described with respect to searching over the Web. The present invention is not necessarily limited to the Web and can be applied in any interactive, computer networking service, including but not limited to the Web.

2. Terminology

The term "real-time" means information, such as a user input and a host site response, can be exchanged in a round-trip cycle between a remote user and the host site with little or no delay, such as, within seconds or minutes (any delay being essentially a function ofthe communication medium and devices connected between a user and the host site).

The term "knowledge base" refers to any one or more databases or other data storage devices that can be searched. For example, a knowledge base can include, but is not limited to, a Structured Query language (SQL) Server 7 database.

The term "Natural Language Processing" refers to a process of examining words and phrases in context to discover meaning.

A "search dimension" identifies a "slice" of the knowledge base within which a variable in a search query can be modified to affect the results of a query. For example, a search dimension in a database of resume data and job posting data, can include, but is not limited to, skill, category, location, availability, etc.

The term "smart domain" (also called a smart domain module) refers to a subsystem which, given a value, returns values in the same search dimension which are more general and more specific. It also returns search results, such as IDs of jobs or profiles, having characteristics meeting these new values. The functionality of a smart domain can be included as part of a suggestion space and/or suggestion engine. Smart domains can include a single search dimension or plural search dimensions.

Tip formatter is a subsystem responsible for taking search values and their associated job/profile IDs from the suggestion engine and formatting them as smart tips.

Smart tips (also known as executable suggestions) are tips returned to the user after a search of the knowledge base which allow executable suggestions to be displayed for widening or narrowing the search to find more or fewer items. In one embodiment, smart tips provide the ability to re-execute a query, with the suggested change in scope, through a mouse click.

Subject matter experts are individuals who thoroughly understand a particular area of knowledge. These individuals can identify and build the relationships between data elements (e.g., keywords or nodes). For example, a subject matter expert can build a taxonomy. A taxonomy is a hierarchical representation of data elements and the relationships between them.

The term "suggestion engine" refers to a subsystem in the present invention responsible for analyzing queries, interrogating smart domains (including suggestion spaces), reconciling smart domain results with baseline query results, and passing the results of the interrogation on to tip formatter.

The term "suggestion space" refers to subsystem in the present invention that includes the data which represents relationships between descriptive elements in the knowledge base and the mapping ofthese relationships to designated search dimensions (e.g., jobs and profiles). This subsystem also contain the processes necessary for building and maintaining these relationships.

3. Finding the Right Information

The present invention provides an intelligent interactive search and data system that instead of simply returning a result set from a database search, also presents "executable suggestions" (also referred to as "smart tips") for narrowing or expanding the search. For example, an executable suggestion for a search for an independent consultant might be:

---
"Are there too few results? Did you know that if you were to expand your location criteria by 20 miles, you'd get 30 more listings? Click here to expand your search".

---

This suggestion is actually executable in that the user can simply click a button in a browser display window implemented as a hyperlink in the text of the smart tip to "execute" the suggestion. For example, the suggestion can be implemented as a hyperlink in the text of the smart tip. This presents immediately useful, executable suggestions for finding the right information.

This solution to the problem of too much information and the desire to connect users with 'just the right information' avoids over reliance on a the end-user and instead leverages the knowledge that an owner of a database has. Indeed, a typical end-user cannot, in fact, know what data is in a given database. The end-user only knows what they are searching for, not what the database might contain that will meet their needs. The owner of a database can know more about the data in the database than a typical end-user could. And the owner of a database can also know quite a lot about what the end-user is searching for, based on analysis of the end-user's query. Therefore, the owner of a database can develop a system where knowledge of the data in the database and knowledge of the query being executed by the end-user is translated into information that will help the end-user find 'just the right information', that is, the most 'correct match'

This solution has to do with two primary areas of knowledge: (1) knowledge of the data (including meta-data) and (2) knowledge of the end-user query. The owner of a database (such as the host site database) has the ability to create systems that can analyze and understand the data values in the database in profound ways. This analysis can capture the possible relationships represented by the data, and more importantly the possible meanings of the relationships of the data in the database. This knowledge of the data in the database is typically stored in the form of statistics and related cross-references about or derived from the data (this is called 'meta-data', i.e. information about the information). This meta-data can be derived in many different ways. For example, the meta-data can be derived from automated analysis of the data (called 'OLAP' for On-Line Analytical Processing). OLAP can then be used to create multi-dimensional indexes (sometimes referred to as 'reverse multi-dimensional indexes') into the data that can be used to access the data in powerful ways. Alternatively and/or additionally, this meta-data can be derived by an individual having expert knowledge of domain data. Alternatively and/or additionally, the meta-data can be derived through a series of SQL statements. Any other known technique for developing meta-data can be used.

With respect to knowledge of the end-user query, by analyzing the component parts of queries developed by end-users to search a local or known database, a system, according to the present invention, can gain knowledge of what users are looking for. Furthermore, by storing and analyzing end-user queries over time, a system can categorize queries and learn about such things as the most used query, least used query, most successful query, least successful query, and more. The collection and analysis of meta-data about data in a database along with the knowledge of what end-users are searching for, and the knowledge of historical query analysis can then be used to develop real-time dynamic matches and executable suggestions that will help ensure the best possible matches are being found—that is, connecting the end-user to 'just the right information'. The present invention presents end-results in the form of dynamic, immediately useful suggestions that can actually be executed by the end-user to either narrow or expand the results of a specific query.

The present invention provides many benefits. The number of high-quality matches on a database is increased. If the success of the owner of a database is based on the number of high-quality matches found by an end-user, then increasing the number of high-quality matches will increase the success of the owner of the database and its Web site.

4. Suggestive Search and Data System

FIG. 1 is a block diagram of a smart data system 100 according to one embodiment of the present invention. Smart data system 100 is an interactive intelligent search and data system. Smart data system 100 includes a suggestion space 110 coupled to a suggestion engine 120. Suggestion space 110 is responsible for building and maintaining the relationships between elements in knowledge base 115. Suggestion engine 120 is responsible for interpreting queries, interrogating suggestion space 110, and returning smart tips 126. Smart data system 100 is coupled to knowledge base 115, knowledge search interface 125, and knowledge expert 135. Smart data system 100 sends data requests to retrieve data about knowledge base 115. Knowledge base 115 returns knowledge base data 118 to smart data system 100. For example, knowledge base data 118 can include both job posting and IC profile data. Knowledge base 115 can also send triggers 116. Triggers 116 are database triggers that are fired when specified data elements change. In this way, smart domain system 100, and in particular, corresponding data in suggestion space 110, is updated and consistent with data content in knowledge base 115.

Knowledge search interface 125 sends queries (e.g., query parameters 128) input by a user or device to smart domain system 100. Query parameters 128 are inputs that describe target information that is the target of a search (e.g., job or IC profile) and search criteria (groups of search dimension, search value, and weighting). Smart tips 126 are output from smart data system 100 to knowledge base search interface 125. For example, a smart tip 126 can include modified search criteria and a value representing the change in result set count that will occur if a search were done with this modified criteria. Knowledge base search interface 125 can then display smart tip 126 as an executable suggestion to the user. For example, knowledge base search interface 125 can be a Web browser. In this case, smart tip 126 is displayed as an executable suggestion in a browser window. The user can then simply input an appropriate display selection (e.g., click) to broaden or narrow a search based on the information provided in the executable suggestion corresponding to a smart tip 126.

Knowledge expert 135 can also provide subject knowledge 136 to smart domain system 100. Subject knowledge 136 can be any intellectual knowledge from a subject matter expert about the relationships between different elements or search dimensions in knowledge base 115. For example, subject knowledge 136 can be used to create and/or modify taxonomies. Subject knowledge 136 is generated manually and/or in an automated fashion.

In one embodiment, smart data system 100 is a component of a web site that supports searching of knowledge base 115 by users. These users can be independent consultants looking for engagements or recruiters looking for qualified job candidates. Smart data system 100 uses data in knowledge base 115 along with subject knowledge 136 to build internal structures (e.g., taxonomies) describing how elements in the knowledge base 115 relate to one another. A search input through knowledge base search interface 125 interrogates smart data system 100 via query parameters 128. Smart data system 100 uses these parameters to traverse its internal data structures looking for ways of narrowing and/or widening the search. The results of the narrower and/or wider searches are aggregated, evaluated and returned in the form of smart tips 126. The structure and operation of smart data system 100 is described further with respect to FIGS. 2 to 8.

5. Suggestion Space

Figure 2:
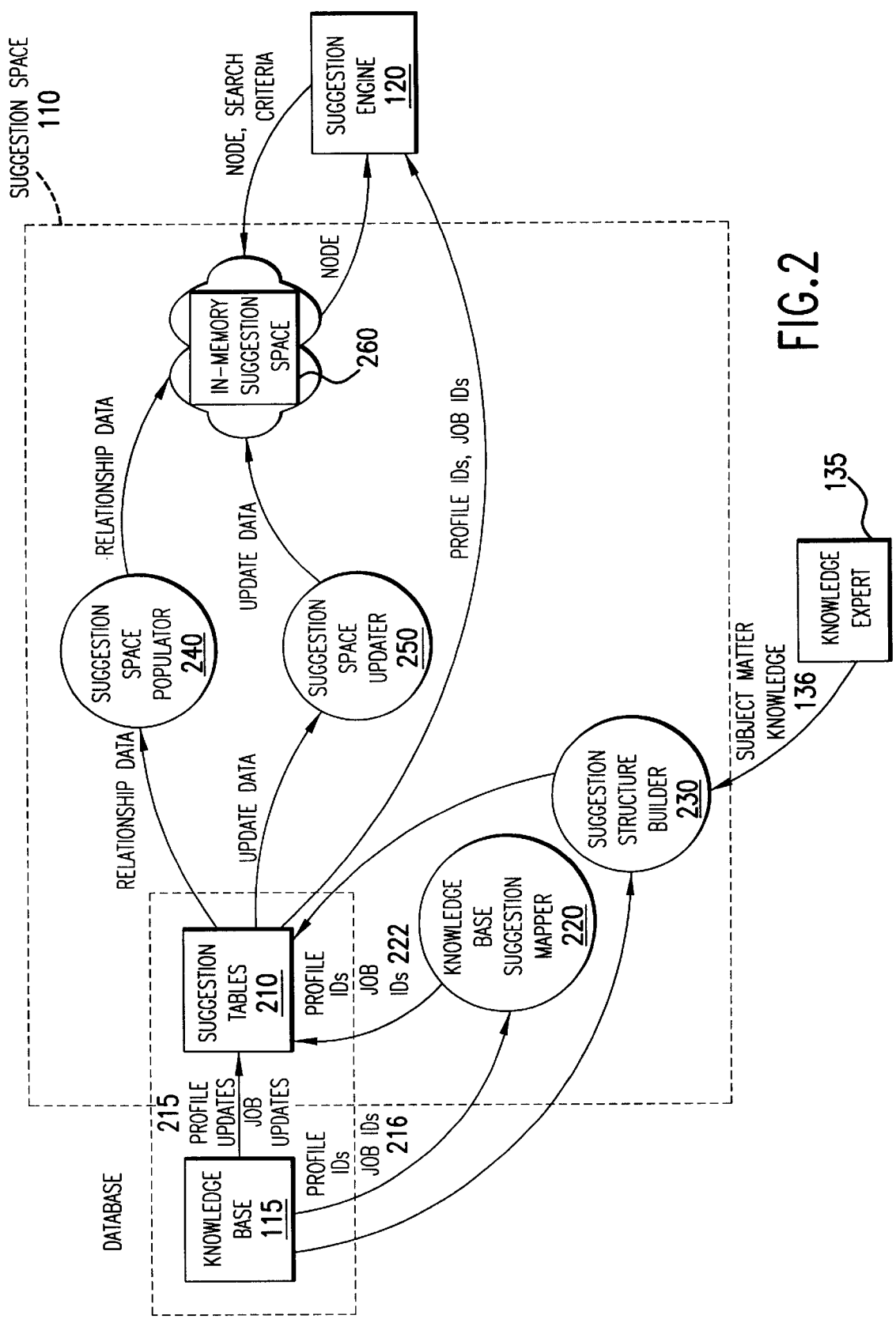
FIG. 2 is a block diagram further illustrating a suggestion space used in the interactive intelligent search and data system of FIG. 1 according to one embodiment of the present invention.

FIG. 2 is a block diagram further illustrating a suggestion space 110 according to one embodiment of the present invention. In practice, suggestion space 110 is actually comprised of one or more suggestion spaces, each having relevance over a respective search dimension. For instance, a host database according to one embodiment consists of multiple suggestion spaces each of which apply to a different search dimension related to job posting and IC profile data. Some of the suggestion spaces included are for skill, category, industry, location, degree, and availability. For clarity, one example suggestion space 110 is described in detail. Each individual suggestion spaces has unique characteristics that depend upon its own respective search dimension, but shares a set of common characteristics as described herein with respect to the example suggestion space 110.

In one implementation according to the present invention, suggestion space 110 is primarily a set of database tables (suggestion tables 210) that relate searchable data elements to each other. These relationships are the basis for determining how changes in the search criteria affect the number of items in the result set. Beyond the database, the data and relationships represented in these tables may be replicated (in whole or in part) in memory resident structures 260 in suggestion space 110. This can be done to speed performance in traversing the suggestion space.

As shown in FIG. 2, suggestion space 110 further includes suggestion tables 210, knowledge base suggestion mapper 220, suggestion structure builder 230, suggestion space populator 240, suggestion space updater 250, and in-memory suggestion space 260. Suggestion tables 210 are coupled to knowledge base 115. For example, suggestion tables 210 and knowledge base 115 can be part of a common database on a host site. Suggestion tables 210 hold information about the relationships between elements in knowledge base 115. Suggestion tables 210 also map relationship endpoints to the jobs and profiles in the knowledge base that have these characteristics. This mapping is done through job and profile identifiers (Ids). Knowledge expert 135 can be an individual or automated agent having expertise in a particular area whose knowledge is used to define and build the relationships in suggestion tables 210.

Suggestion structure builder 230 is coupled between knowledge base 115 and knowledge expert 135. Suggestion structure builder 230 is module that helps knowledge expert 135 build relationships in suggestion tables 210. For some suggestion tables 210, this process may be an entirely manual process through a user-interface while for others, it may include executable programs to aid in this task.

Knowledge base suggestion mapper 220 is a module that analyzes the relationship end-points in suggestion tables 210. It then searches knowledge base 115 for jobs and profiles having those end-points as characteristics. Knowledge base suggestion mapper 220 receives the corresponding job IDs and profile IDs 216 and writes them into suggestion tables 210.

Suggestion space populator 240 is a module that reads the relationships and ID mappings from suggestions tables 210 and populates a memory-resident data structure 260 with this information. This structure can then be searched quickly by suggestion engine 120. In-memory suggestion space 260 then is a set of data structures, mirroring (in whole or in part) the relationships and mappings in the suggestion tables 210, which reside in memory (e.g., a cache or other memory with a fast access time). These structures can be searched by suggestion engine 120 to identify narrowing and widening criteria for searches. Suggestion space updater 250 is a module that reacts to changes (e.g. data writes) in suggestion tables 210 and propagates those changes into in-memory suggestion space(s) 260. In-memory suggestion space 260, suggestion space populator 240, and suggestion space updater 250 are each optional and can be omitted if performance optimization is not an issue or if querying suggestion tables 210 in a database is not too slow.

As shown in FIG. 2 and described further below, suggestion engine 120 is coupled to suggestion space 110 (either directly to suggestion tables 210 or to in-memory suggestion space 260). Suggestion engine 120 interrogates suggestion space 110 based on node and search criteria. Suggestion engine 120 then obtains a node and corresponding profile and job IDs associated with the modified search results (wider or narrow search results). In this case, the node represents a value in the suggestion space. For example, if this were the skills domain, the node moving from suggestion engine 120 into suggestion space 110 may equal "C++". The node moving in the reverse direction may be "Java" representing a suggested change to the search.

6. Building/Maintaining the Suggestion Space

Suggestion space tables 210 are initially built from data in knowledge base 115 and input from experts 135 in various fields of study represented in the knowledge base. Once suggestion space tables 210 are built, the tables are populated with the IDs of the jobs and profiles that are characterized by the elements in this structure. The tables 210 are then kept up to date using triggers (see FIG. 1) in knowledge base 115. For example, when a consultant adds/removes a skill from their profile, that consultant's profile ID is then added/removed from the appropriate table(s) 210 in the suggestion space (and the table in the in-memory suggestion space 260 through the work of suggestion space updater 250).

As mentioned above, part or all of the data in the tables representing the suggestion space may be replicated in memory. When the smart data system 100 is started, suggestion space populator 240 reads the suggestion space tables from the database and populates in-memory data structures with this relationship information. The target data structures may have a different architecture than the database tables in order to optimize in-memory searching, but they will represent the same information. Once populated, the memory-resident suggestion data in space 260 will be kept up to date through triggers attached to the suggestion space database tables 210.

Suggestion engine 120 can query either the in-memory data structures 260 or the suggestion space database tables 210 for information on narrowing or widening a search.

7. Example Suggestion Space Table Designs

Example suggestion tables 210 are described below. These examples relate to search dimensions in a database having job posting and IC profile information, and represent one possible implementation of suggestion tables 210. The dimensions of the data included in the suggestion tables are category, skill, location, degree, field of study, availability, and industry. These examples are illustrative and not intended to limit the present invention. The suggestion tables are grouped by the search dimension to which they apply.

a. Category Dimension

CatParent Table

| Cat_ParID | Content |
|---|---|
| ParentID | (references another CatParent item; −1 if top node) |
| CatID | (references a category in the Cat table) |
| Ord | Order of display |

Cat Table

| CatID | Content |
|---|---|
| CatDisName | (name of this category) |
| SysNote | |

CatProfile Table

| ID | Content |
|---|---|
| CatID | (references category in Cat table) |
| ProfileID | (references profile in icPlanet knowledge base) |

CatJob Table

| ID | Content |
|---|---|
| CatID | (references category in Cat table) |
| JobID | (references job in icPlanet knowledge base) | b. Skill Dimension

SkillParent Table

| ID | Content |
|---|---|
| ParentID | (references another SkillParent item; −1 if top node) |
| SkillID | (references a skill in the Skill table) |

Skill Table

| ID | Content |
|---|---|
| Name | (name of this skill) |

SkillProfile Table

| ID | Content |
|---|---|
| SkillID | (references skill in Skill table) |
| ProfileID | (references profile in icPlanet knowledge base) |

SkillJob Table

| ID | Content |
|---|---|
| SkillID | (references skill in Skill table) |
| JobID | (references job in icPlanet knowledge base) | c. Location Dimension

Rather than a taxonomy, this is an influence space that describes how changes in the required proximity between the consultant and the job changes the number of items returned by the search. One possibility here is to actually expand the proximity requirement before it is sent to the database. This will return more rows than the user requests. The rows meeting the original proximity requirement are returned to the user, the others are evaluated to discover proximity spheres within which the number of items can be counted. The sphere distance, along with the extra number of items can be returned as a smart tip.

d. Degree Dimension

This is a simple hierarchical taxonomy where degrees progress in rank.

DegreeType Table

| DegreeID | Content |
|---|---|
| Name | Name of degree |
| Rank | Order of degree |

DegreeProfile Table

| ID | Content |
|---|---|
| DegreeID | References DegreeType table |
| ProfileID | References profile in the knowledge base |

DegreeJob Table

| ID | Content |
|---|---|
| DegreeID | References degree in DegreeType table |
| JobID | References job in the knowledge base | e. Field of Study Dimension

FieldParent Table

| ID | Content |
|---|---|
| ParentID | (references another FieldParent item; −1 if top node) |
| FieldID | (references a field of study in the Field table) |

Field Table

| ID | Content |
|---|---|
| Name | (name of this field of study) |

| FieldProfile Table | |
|---|---|
| ID | Content |
| FieldID | (references field in Field table) |
| ProfileID | (references profile in icPlanet knowledge base) |

| FieldJob Table | |
|---|---|
| ID | Content |
| FieldID | (references field in Field table) |
| JobID | (references job in icPlanet knowledge base) | f. Vvailability Dimension

Rather than a taxonomy, this is an influence space that describes how changes in the required availability modify the number of items returned in the result. For example, if user asks for someone available now, they may want to expand search to find someone available next week.

g. Industry Dimension

| IndustryParent Table | |
|---|---|
| ID | Content |
| Parent ID | (references another IndustryParent item; −1 if top node) |
| Industry ID | (references an industry in Industry table) |

| Industry Table | |
|---|---|
| ID | Content |
| Name | (name of this industry) |

| IndustryProfile Table | |
|---|---|
| IndustryID | (references industry in Industry table) |
| ProfileID | (references profile in icPlanet knowledge base) |

| IndustryJob Table | |
|---|---|
| ID | Content |
| IndustryID | (references industry in Industry table) |
| JobID | (references job in icPlanet knowledge base) |

8. Suggestion Engine

Figure 3:
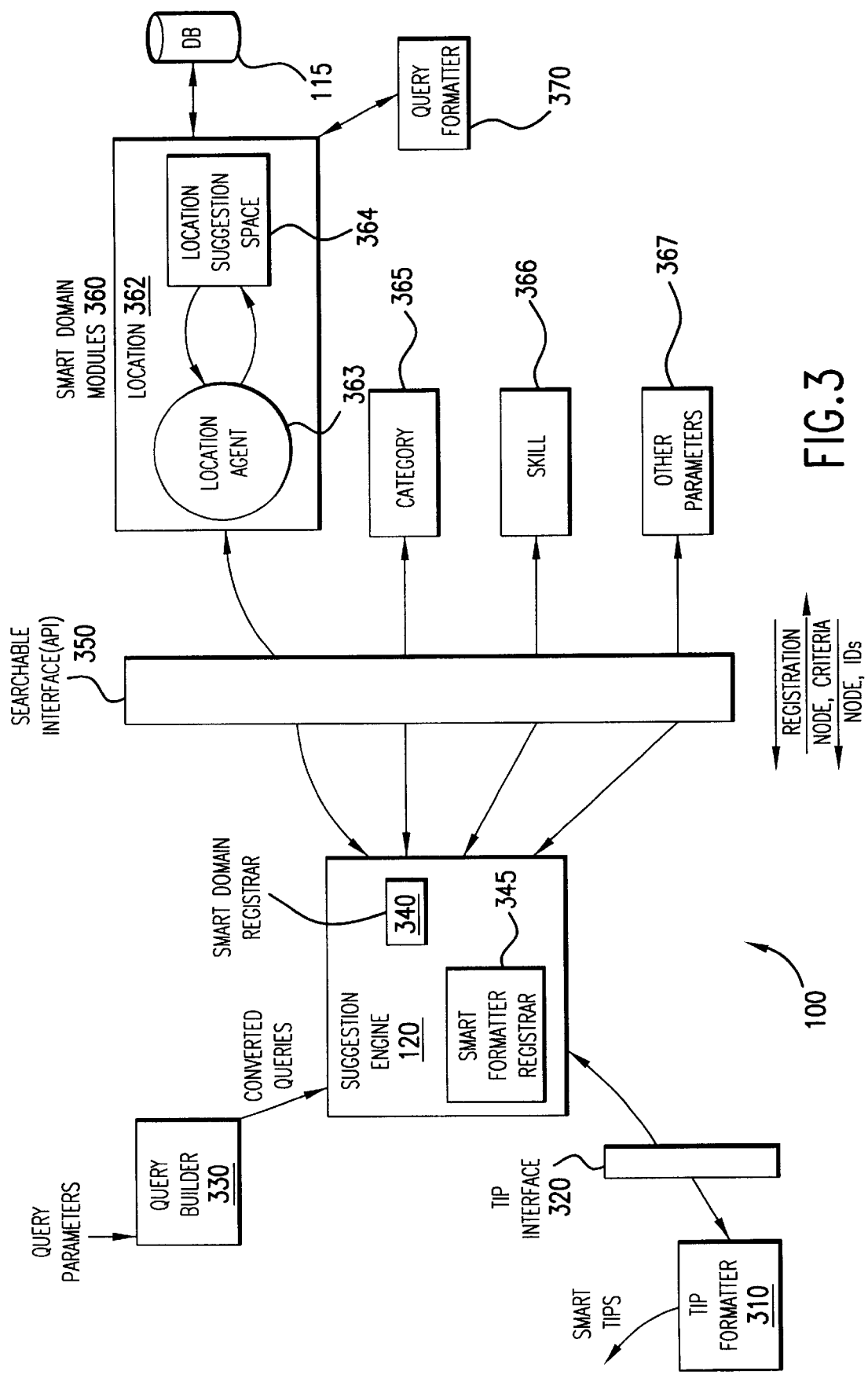
FIG. 3 is a block diagram further illustrating a suggestion engine used in the interactive intelligent search and data system of FIG. 1 according to one embodiment of the present invention.
Figure 4A:
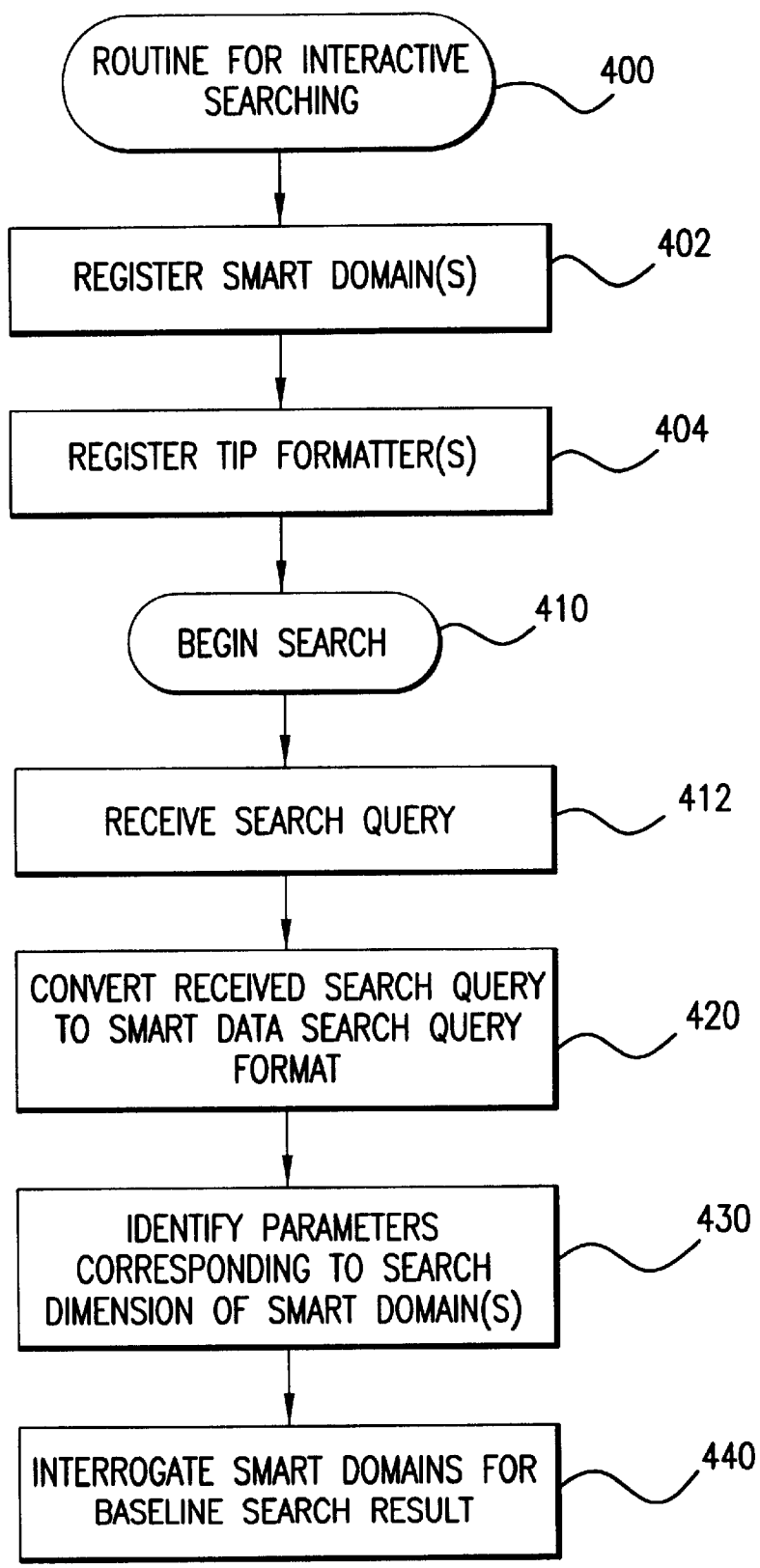
FIGS. 4A and 4B are a flowchart of a routine for interactive searching according to one embodiment of the present invention.
Figure 4B:
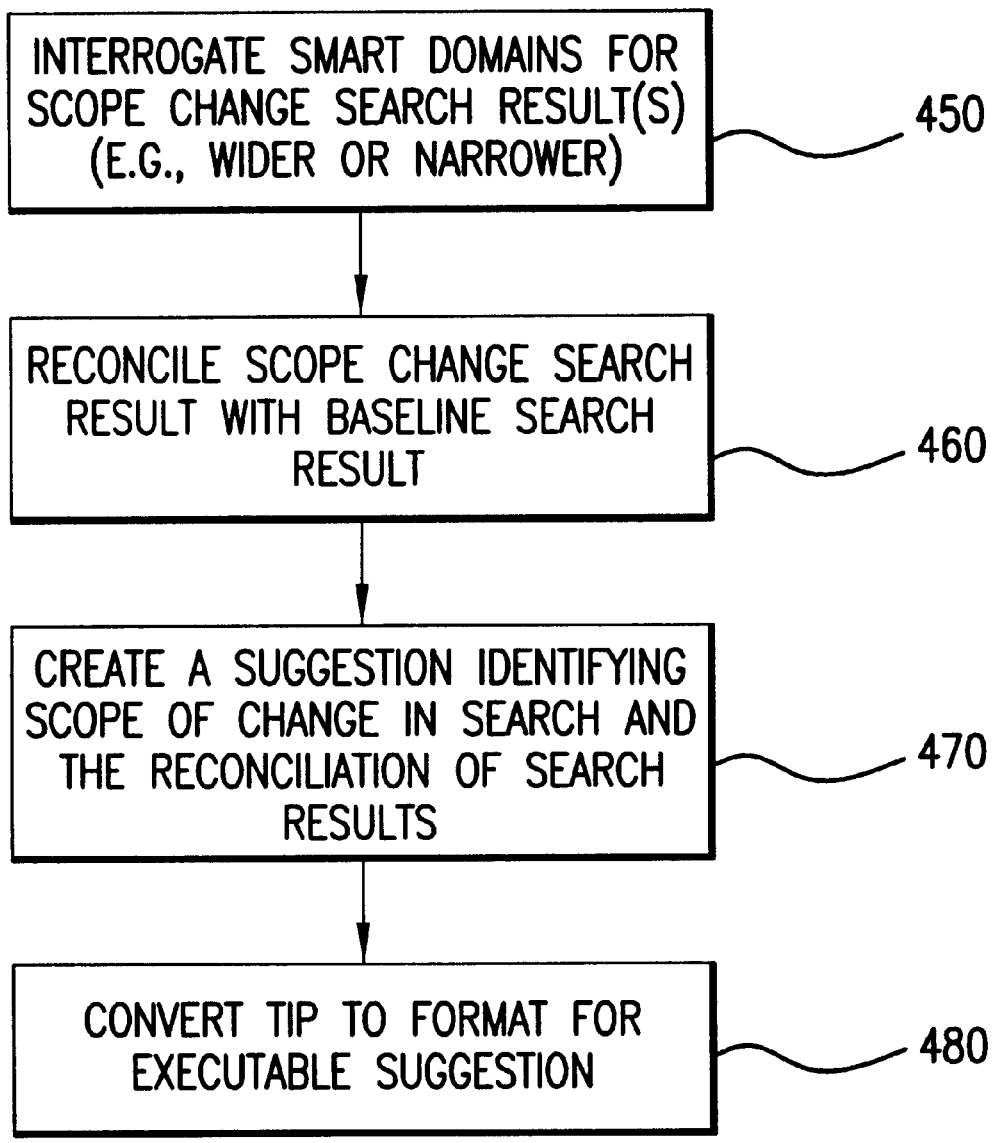

FIG. 3 is a block diagram illustrating smart data system 100 in further detail according to one embodiment of the present invention. In this embodiment, smart data system 100 includes suggestion engine 120, tip formatter 310, tip interface 320, query builder 330, smart domain registrar 340, searchable interface 350, smart domain modules 360, and query formatter 370. Suggestion engine 120 acts as a controller of smart data system 100. Smart domain modules 360 are responsible for interacting with respective suggestion spaces. In one example, three smart domain modules 362, 365, and 366 are provided for respective search dimensions (location, category, skill, or any other parameter). Alternatively, two or more dimensions can be associated with any one smart module. A fourth smart domain 367 represents that there can be other smart domains for other search dimensions. Tip formatter 310 is responsible for formatting smart tips for presentation to a user. Tip interface 320 is a communication interface (such as, an application programming interface (API)) between tip formatter 310 and suggestion 120. Searchable interface 350 is a communication interface (such as, an application programming interface (API)) between smart domain modules 360 and suggestion engine 120. Query builder 330 is coupled to suggestion engine 120. Query builder 330 converts query parameters from input formats (e.g., search queries, strings, etc) to a converted format compatible with suggestion engine 120. Smart domain registrar 340 is a module within suggestion engine 120 that is responsible for registering components of smart domain system 100. In particular, smart domain registrar 340 registers (and unregisters) each smart domain module 360 and tip formatter 310. In another arrangement, one or more separate registrars are respectively dedicated to one or more tip formatters.

Suggestion engine 120 is a module that is the controller of smart data system 100. Suggestion engine 120 can call registered smart domain modules 360 (e.g., a location smart domain 362, category smart domain 365, skill smart domain 366, or a smart domain for another search dimension or parameter 367). Suggestion engine 120 provides node and search criteria to a smart domain module 360. A "node" can be any data element or value within a suggestion table in a suggestion space. The "search criteria" is a value identifying whether to broaden and/or narrow a search, and includes other information required to carry out the searching. Suggestion engine 120 then receives search results for broader and/or narrower searches in the suggestion space that can be passed to tip formatter 310 to generate smart tips.

In one example embodiment, each smart domain module 360 includes an agent and a suggestion space. As shown in FIG. 3, location smart domain module 362 includes a location agent 363 coupled to suggestion space 364. Location agent 363 is a module that traverses suggestion space 364 based on the node and search criteria passed from suggestion engine 120 and returns node and the search results of the broader and/or narrower search(es). The search results can include record identifiers of hits found in the broader and/or narrower search(es) of a suggestion space. For example, the search results from location suggestion space 364 can be profile Ids and/or job posting Ids. Location agent 363 then passes node and profile Ids and/or job posting Ids through search interface 350 to suggestion engine 120. Counts of the profile Ids and job Ids can also be passed. Note in an alternative example, location agent 363 can be included (all or in part) in suggestion engine 120 (or in search interface 350) instead of in smart domain module 362, as would be apparent to a person skilled in the art given this description.

Suggestion engine 120 breaks input query parameters into individual search dimensions and determines if any registered smart domain modules 360 work in those search dimensions. Suggestion engine 120 then calls the appropriate smart domain (through searchable interface 350) to retrieve narrowing and widening nodes (data elements) and search results (e.g., profile Ids, job IDs). After calling all appropriate smart domains 360, suggestion engine 120 aggregates and normalizes the returned results (e.g., profile Ids, job IDs) within each search dimension. Finally, Suggestion engine 120 packages up the resulting data elements and IDs into smart tips and determines which of the registered tip formatter 310 to call. Tip formatter 310 is then called by suggestion engine 120 to format the returned search results and node information into executable search suggestions (also called smart tips) for presentation to another system.

Each of these components is described further below. Smart domain module 360–367 (also called smart domains) contain the data and knowledge required to suggest changes in a single search dimension that will narrow and widen the number of items in a search's result set. In an alternative arrangement, each smart domain module contains the data and knowledge required to suggest changes in two or more search dimensions. Smart domain module 360–367 register themselves with suggestion engine 120 (i.e., registrar 340) specifying the search dimension of which they have knowledge. In one embodiment, smart domain module 360–367 implement searchable interface 350 providing them a standard means of communication with suggestion engine 120.

Smart domain module 360–367 (which can include agents), when requested, traverse through their known suggestion space to find criteria that are either more general or more specific. Once found, these criteria are used to query suggestion tables 210 and/or in-memory suggestion space 260, depending on where the relevant information resides, to obtain the IDs of data elements that meet these new criteria. The new criteria and resulting IDs are then returned to suggestion engine 120.

In one furtherembodiment, searchable interface 350 defines a standard set of methods that must be implemented by a smart domain 360. This is the method by which smart domains 360 are abstracted from suggestion engine 120. If a smart domain 360 implements this interface and registers itself with the suggestion engine 120, the engine 120 can be guaranteed that the interface methods will be available. This allows for the dynamic addition of new smart domains without modifying the suggestion engine (e.g., without modifying hardware or software in the suggestion engine).

Tip formatters 310 (also called smart formatters) are subsystems that interpret smart tips and format them for use by an external system (such as browser). Tip formatters 310 also register themselves with suggestion engine 120 and specify their output type in registering. Tip formatters 310 implement a smart tips interface 320 to provide a standard means of communicating with the suggestion engine 120. When requested, tip formatters 310 know how to read smart tips and transform them into a predefined format for use by an external system (e.g., a browser).

Tips interface 320 defines a standard set of methods that must be implemented by a tip formatter 310. In this optional example, then, the formatting of smart tips is abstracted from suggestion engine 120 through this interface. If a tip formatter 310 implements this interface and registers itself with suggestion engine 120, the engine can be guaranteed that the interface methods will be available.

9. Processing a Search with Smart Tips

The operation of smart domain system 100 and its components are described further with respect to FIGS. 4 to 8. FIGS. 4A and 4B are a flowchart of a routine 400 for interactive searching according to one embodiment of the present invention (steps 402–480).

Once the suggestion engine 120 has started, smart domains 360 can be iinstantiated and register themselves with suggestion engine 120 specifying the search dimension for which they can provide information (step 402). Tip formatters 310 can also be instantiated and registered with suggestion engine 120 specifying the type of formatting output they provide (step 404). The search is then begun (step 410).

Query builder 330 receives a search query input by a user and converts, if necessary, the query to format compatible with suggestion engine 120 (steps 412 and 420). Suggestion engine 120 takes query parameters input from query builder 330. These query parameters correspond to a request for information about a search. Suggestion engine 120 parses through these parameters identifying the search dimension and search value of each (step 430). As suggestion engine 120 processes a parameter, it looks through its internal list of registered smart domains 360 to find those that apply to that parameter's search dimension. If an appropriate smart domain 360 is identified it is traversed to return the value and associated IDs of either a more general or a more specific search criteria (steps 440–480). For example, in step 440, the appropriate smart domain 360 is interrogated to determine a baseline search result (corresponding to the unmodified, initial search query). Next, smart domain 360 is interrogated for scope change search results (step 450).

Figure 5:
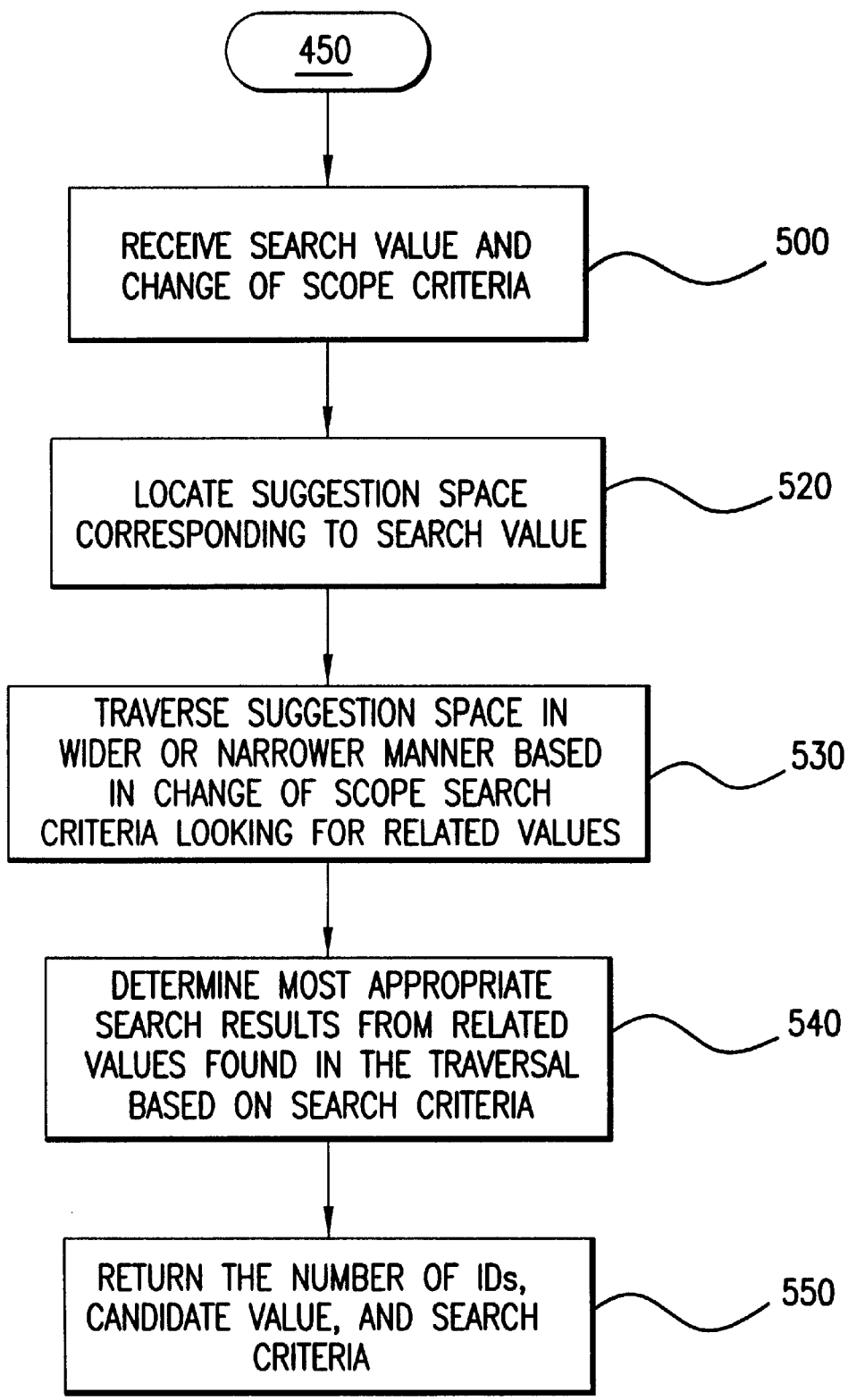
FIG. 5 is a flowchart showing in further detail a step in FIG. 4B of interrogating smart domains for scope change search results according to one example implementation of the present invention.

FIG. 5 is a flowchart showing in further detail a step 450 of interrogating smart domains 360 for scope change search results according to one example implementation ofthe present invention. First, a smart domain 360 (e.g. location agent 363) takes a search value (e.g. location in Oakland, Calif.) and a scope change criteria (either narrow or widen) as input to a request (step 510). Smart domain 360 (e.g. agent 363) locates a suggestion space (e.g. suggestion space 364) (step 520), and then traverses the suggestion space in either a widening or narrowing manner looking for related values (step 530). First, out of the related values the smart domain 360 finds it determines which provides the most appropriate change in results given the scope change criteria (broaden or narrow). It makes this determination by analyzing the number of IDs associated with each candidate value. Once the 'best' value is determined (step 540), the smart domain (e.g. agent 363) returns that value and its associated IDs to suggestion engine 120 (step 550). Suggestion engine 120 gathers all the new scope change search result values and their associated Ids and reconciles them with the previously determined baseline search results (step 460). For example, it aggregates and normalizes the IDs one search dimension at a time determining the change in result set count for each change in search value. Suggestion engine 120 then constructs a smart tip (also called a suggestion or hint) from these new values and associated ID counts (step 470). Once the smart tips are built, suggestion engine 120 looks through its internal list of tip formatters 310 for one that will output the smart tip in a desired format for an executable suggestion (step 480).

FIG. 6 shows an example screen displayed to a user that includes executable suggestions for widening or narrowing a search according to one embodiment of the present invention. In this way, executable suggestions help lead a user interactively and adaptively in real-time to the right information.

In another example of the present invention, suggestions are provided to help a user to create an effective profile. FIGS. 7A, 7B, and 7C are illustrations of screens served to a hiring manager as part of inputting a profile for a search for independent consultants. Suggestions are generated and displayed to further guide the hiring manager while he or she is configuring and entering a profile through the screens. Although the suggestions depicted in FIGS. 7A, 7B and 7C are not executable suggestions, in another embodiment, the suggestions are provided to the hiring manager as executable suggestions, as described above. FIG. 8 is a diagram of an example Web site portal that can incorporate the present invention.

The display screens described herein are illustrative and not intended to limit the present invention. For example, a smaller or larger number of screens can be used. Different types of information and format can be included in screens in accordance with the present invention. Any type of user input entry device can be used, including but not limited to templates, forms, voice or other data entry mode.

10. Smart Tips

In one embodiment of the present invention, smart tips come in several flavors throughout a Web site. Some smart tips are generated by the smart data system 100, others are simply static text presented to help the user. The purpose of smart tips is to help the user: 1) enter information correctly/completely, 2) 'up-sell' the user at appropriate times, or 3) make suggestions to help the user find 'just the right information' by automatically narrowing or expanding a search.

There are essentially three forms of smart tips:

Static Smart Tips—these are simply static text messages that always appear on certain pages in the site. For example, on the skills section of the IC professional profile creation screen, there is a static smart tip of the form "Use Buzzwords, Employers search our database primarily by keyword. To improve your chances of being hired, use keywords that describe valuable skills".

Dynamic Smart Tips—these are tips that appear based on some action the user has taken on the site, or related to where the user is on the site or what they are trying to accomplish. The actual text of a Dynamic Smart Tip is not actually dynamic, however when and whether these tips appear is, in fact dynamic. A simple example of a Dynamic Smart Tip is that while a user if filling out a job posting, we might suggest that it's critically important to fill in a particular field. If the user has already filled in the field, the Dynamic Smart Tip doesn't appear. A more complex example of a Dynamic Smart Tip is when a user finishes completing a job posting, smart data system 100 might present a tip that attempts to 'up-sell' them to a for-fee service, such as "Create a Pre-screening Test", "Become a Featured Employer", "Make this job posting 'rise to the top' by making it a Featured Posting", etc.

Dynamic Smart Tips generated by the smart data system 100 are the most complex types of dynamic smart tips. They are generated 'on-the-fly' in real-time. Dynamic smart tips are one way to ensure that more high-quality matches will occur on a Web service. They are based on an analysis of the query the user is executing and the 'cross-indexing' of the knowledge base. They are used to present suggestions to the user for either narrowing or expanding the results of a search on a web site.

For example, after searching for a DBA in Seattle, we might present a smart tip that says "Did you know, that 70% of the skills listed by DBAs are also listed by Programmers, if you include Programmers in your search, you'll get 43 more candidates—click HERE to do so". Another example of a smart tip might be "Did you know that if you narrow your location by 5 miles, you'll get 10 fewer results, click HERE to do so".

Smart tips are used in the following areas of an example web site according to the invention:

1. While a user is filling out a form (professional profile, job posting, etc.), smart data system 100 will present Static or Dynamic Smart Tips to help ensure that the forms are completed correctly, or to help encourage the user to fill out certain fields completely or with suggested content (keywords v. sentences, etc.)
2. When a user has completed some action for which smart data system 100 would like to present an 'up-sell' message, Dynamic Smart Tips are presented to help encourage users to take an additional action or purchase an upgraded service.
3. When a user has completed a search of the database, smart data system 100 can provide smart tips to automatically narrow or expand their search results. This will help ensure that more high-quality matches will occur on the web site service.

11. Example IC Knowledge Base and Application

In one example implementation, smart data system 100 is used to improve on the inefficiencies present in current job search processes on the Web. The present invention takes advantage of the targeted scope of the knowledge base (e.g. jobs and profiles) as well as the ability to analyze this local data to direct users to the information they are looking for. This application produces further advantages and benefits in Web recruiting and employments services.

Smart data system 100 benefits both employers searching for qualified independent consultants and independent consultants searching for engagements. Smart data system 100 can provide the best suggestions for both narrowing and expanding the scope of a search. During a search of the knowledge base, the result set returned to the user may have too many or too few items for the user's liking. In the case of too many values in the result set, smart data system 100 provides suggestions for narrowing the search. Following these suggestions will result in fewer items in the result set. In the case of too few values in the result set, Smart data system 100 provides suggestions for expanding the search. Following these suggestions will result in more items in the result set.

Smart data system 100 further supports Boolean relationships between query parameters. When a search is run against the knowledge base, Boolean relationships (and/or relationships) between the query parameters affect how they are interpreted, thereby affecting the number of items returned in the result set. Smart data system 100 understands the differences between these relationships and accurately reflect how changes in the search criteria will effect the result set considering these relationships. Smart data system 100 returns results in a timely manner. The speed of Smart data system 100 is important. Once a user has launched a search, they want their results back quickly. These results include both the result set of the search and the associated smart tips. If the search process becomes slow and frustrating to the user, although it may return useful information, they will go elsewhere. While returning the result, set of the search quickly is of primary importance, there is some leeway in returning the smart tips in certain applications. This is due to the fact that it will take the user some amount of time to interpret the result set to determine if they have too many results, too few results, or the correct number. During this time, smart data system 100 can be generating smart tips and dynamically populating the search page with them for execution by the user when ready.

According to a further feature, smart data system 100 can scale without significant degradation of performance as user count and concurrent use count increases. Smart data system 100 can also understand criteria weighting. During a search, both recruiters and consultants can be allowed to weight or prioritize the criteria they specify during a search. (i.e. they specify which criteria is most important to them). Smart data system 100 accounts for these weightings and makes executable suggestions in accordance with them. For example, if a recruiter searches for a consultant indicating that their proximity to the job is the most important criteria, Smart data system 100 offers suggestions in other search dimensions before suggesting that the recruiter change their proximity requirement.

Further advantages of the present invention in other alternative embodiments are smart data system 100 can be developed as a licensable technology. Given the state of search capabilities on the internet today, it is anticipated that the type of searching capabilities according to the present invention would be of tremendous value to other companies with a targeted knowledge base. Smart data system 100 can be applied to other companies' knowledge base searching problems with a minimal amount of changes. All interfaces to specific data in knowledge base 115 can be sufficiently abstracted so that the core technology could be reused on other databases. Application of the Smart data system 100 on another data set would then require extending a smart domain to interpret the new data set.

Likewise, smart data system 100 can be made platform independent to allow customers or licensees to implement the system on a platform of the customer's choice.

As jobs and profiles are added, removed, and changed in the knowledge base, smart data system 100 can have access to these changes as quickly as possible to provide quality information. This requires that smart data system 100 internal storage structures be updated at or close to real time.

Smart data system 100 can also be extensible. As knowledge base 115 expands and evolves, new search requirements may surface. Smart data system 100 can be designed to make the addition of new search criteria as easy as possible. A new smart domain can be plugged in without having to modify other components.

Other possible designs and applications of smart data system 100, not intended to limit the present invention, include the following options. Searching is generally done against values that are normalized out of specific instances and enumerated in a separate table. This holds true for skill, category, field of study, degree, industry, searching against free text, full text indexing, etc. Each search dimension (e.g. skill, category, availability, etc.) can have its own suggestion space that relates elements to each other without influence from other search dimensions. This does not imply that the smart data system 100 will only provide smart tips in one dimension for a given search. It can provide smart data system 100 in many search dimensions. However, in one example, each of these smart tips indicates how the result set will change if the given suggestion is used and all other search criteria remain the same. Each search dimension (e.g. category, skills, proximity, etc.) has its own suggestion space. This could be a taxonomy (for a dimension such as skills), a hierarchical data representation (for a dimension such as degree), or some other type of knowledge structure. The quality of suggestions on a search dimension is directly related to the quality of that dimension's suggestion space.

In one example to generate tips even more easily and quickly, one smart tip returned from smart data system 100 represents a change in one search dimension. For example, a smart tip may state that expanding the proximity to job requirement 10 miles will return 20 more consultants. Two tips are used to expand the proximity to job requirement 10 miles AND include C++ as a skill will return 35 more consultants. One tip states that expanding the proximity to job requirement 10 miles will return 20 more consultants. The other tip states that including C++ as a skill will return 23 more consultants. Also, a smart domain could be written to return this as a single suggestion.

12. Quick Search, Smart Search and Guided Search

Another aspect of the present invention, not intended to limit other aspects of the present invention described above, is that three types of searches (quick, smart, and guided) can be provided for a Web service. All three search mechanisms can focus on 'finding ICs' and/or 'finding Job Postings'.

All search mechanisms on the service are similar in the following ways:

1. All search mechanisms use the same underlying searching and matching technology, i.e. the smart tips and smart data system 100.
2. All search mechanisms present results in a consistent manner. I.e. the same (or very similar) search result screens will be presented—the 'standard search results screen'.
3. All search mechanisms present result sets (lists of data) that can be sorted further via column headings presented on the results page (e.g. sort the list by date, years of experience, location, etc.). The three types of search screens are used:

Quick Search—this is a simplest form of search on a site, similar to many other 'one button' search mechanisms on the web today. Basically this is a small window (or button), that allows the user to type in one or more keywords and click submit ('Go', etc.). This would then execute a keyword search and present the results in the standard search results screen.

Smart Search—this is a step up in complexity, just above Quick Search. The basic idea is that 'Smart Search' simply allows the user more discreet criteria to specify their search. So for instance, a series of drop-downs and selection boxes are presented to allow several search criteria such as keywords, education, location, etc. This is the most common type of search in the web today.

Guided Search—this is the most complex type of search offered according to a service of the present invention. The basic premise is that smart data system 100 creates detailed versions of search screens that present keywords and other identifiers that are actually derived from the data. This is the idea of 'guided search', i.e. the user is guided through selecting all the important search criteria. The idea being that more detailed and, in fact, more effective searches will be the result. The lists of search criteria is grouped by job category and possibly industry, etc. Lists of information presented to the user in Guided Search are derived initially from the data in the resume database. I.e. the potential list of criteria will be derived from the actual data and then a human will make the 'final cut' on the presentation of the Guided Search approach.

13. Taxonomy Example

As described above, smart data system 100 can use taxonomies in its suggestion spaces. A brief description of lexical taxonomy is provided. This description is illustrative, and not intended to limit the present invention, as other type of taxonomies and data structures can be used.

A feature of a web site, according to an example implementation of the present invention, is the ability to match independent consultants with projects. Typically this would be accomplished through a search of the data initiated by either the consultant or the employer. Independent consultants would be searching for projects (engagements) that interest them. Hiring managers would be searching for consultants that meet certain criteria. The ability to provide credible, relevant matches will directly contribute to the user experience and, ultimately, the success of the web site.

A. Conceptual Taxonomy

Classical hierarchical indexes do not work well in this arena given the inherent ambiguous nature of the human vocabulary. Instead, a conceptual taxonomy provides a much better mechanism for evaluating the relevance of a query against the document base. A conceptual taxonomy can be thought of as hierarchical organization of concepts that links each concept to its 'most specific subsumers' (i.e. the most specific known concepts that are more general than the concept in question) and to other semantically-related concepts (e.g. those in which this concept is a modifier). This structure can then be used to find connections between terms of a request and related concepts in the index.

What follows is a discussion of components/steps used to build a system of this type.

B. Preparing the Data

The first step in building a conceptual taxonomy solution to searching is to analyze the document base to be searched identifying concepts and the relationships between them. A reference to the location of the document embodying a concept (and possibly the location within the document) is kept with the concept instance.

C. Analyze the Data

There are many steps in analyzing the document base. The goal in this step is to break the documents into manageable pieces that can be evaluated against each other.

D. Tokenize

This step segments a series of characters into tokens. (words, symbols, punctuation, etc.) Rules are applied in an attempt to normalize such things as phone numbers, email addresses, hyphenated words, etc.

E. Analyze

Tokens identified in the previous step are analyzed to identify their true meaning. This is known as disambiguation. Once identified a determination can be made on what to do with them. Identifying a word involves not only looking at the word itself, but the words around it as well. Is it a noun, a verb, part of a phrase, etc.? Does it have a known semantic relationship to other words?

Most times a lexicon is used to help identify words. This lexicon will usually include syntactic and semantic information about words and phrases including information about different word senses and interpretations. These lexicons are quite large and labor intensive to build. Fortunately there are several available in the public domain.

F. Morphology

Words that cannot be found in the lexicon are put through a process known as morphology. This process tries to evaluate the word and change it into something recognizable. Derivational rules are applied to words with identifiable prefixes and suffixes, inflection rules are applied to determine verb tense, and lexical compounding, or word concatenation, (e.g. shoelace) is identified. The ultimate goal of this step is to find a word that can be evaluated in the lexicon.

G. Phrase Extraction

A group of words (a phrase) may embody a different concept than the sum of the concepts of the individual words within that phrase. This step attempts to identify phrases and map them to a single concept that can be entered into the taxonomy.

H. Build the Taxonomy

Concept Assimilation

This process looks at entities in the source document and attempts to identify them by concept. Entities are evaluated from largest (phrase) to smallest (word). Phrases are analyzed for related, more general concepts that subsume the phrase concept. For example, the phrase 'automobile upholstery cleaning' generates three concepts: [automobile upholstery cleaning], [automobile cleaning], and [upholstery cleaning]. The two shorter phrases represent more general concepts that subsume the initial concept and may subsume other related concepts that would then be conceptually clustered. These subsuming phrases will themselves be subsumed by more general phrases. So the taxonomy would look something like:

[cleaning]
   [automobile cleaning]
      [automobile upholstery cleaning]
      [automobile window cleaning]
   [upholstery cleaning]
      [automobile upholstery cleaning]
      [sofa cleaning]

Note that the concept [automobile upholstery cleaning] is indexed in two places. This is perfectly acceptable and, in fact, preferable. The target concept could be reached through two different concept trees giving the user a better chance of finding it.

Phrases are broken down until individual word entities are reached. The concepts of these words are indexed in the taxonomy as well using the lexicon for related concepts. For example, the word 'treat' may be indexed under the conceptual action [cure] as well as the conceptual noun [snack].

I. Organization

In order to use the taxonomy efficiently for searching and retrieval purposes it must be organized in a way that allows for quick traversal between concepts. To facilitate this, concepts must be organized into a structure in which every concept has explicit pointers to its most specific subsumers and from its most general subsumees.

Other well-known aspects of building a conceptual taxonomy, such as, including natural language processing, conceptual structure, quantificational tags, relational abstraction, etc., can be added as would be apparent to a person skilled in the heart given this description.

J. Querying the Data

Once the conceptual taxonomy is built, it can be used to find relevant information in the document base. Queries are evaluated against the taxonomy to locate documents that are in the same 'conceptual neighborhood' as the request.

K. Parse the Request

The triggering mechanism for using the taxonomy is a request for data. This request is typically written in the English language and has many of the same qualities as items in the document base. Therefore, many of the same processes applied to the document base would be applied to the request. These include tokenization, analysis, morphology, and phrase extraction. For a more detailed discussion of these topics see the previous section.

L. Search the Taxonomy

Once the request has been parsed and broken into concepts, these concepts can be applied to the taxonomy. Traditional searches of hierarchical indexes would start at the root of the index and traverse it in either 'breadth-first' or 'depth-first' fashion. With a conceptual taxonomy the search can be much more efficient. A search can jump directly to an indexed concept or to the most specific subsumer of the concept if it is not in the taxonomy. This puts the search into a 'conceptual neighborhood'. Once focused on a conceptual neighborhood the seeker can move up (more general) or down (more specific) through the taxonomy. The taxonomy also supports the notion of sideways (sibling wirespect to MSS) relationships when two concepts have the same MSS 'parent'.

M. Example Implementation

In one case, most data entered into a web site (that will form the document base for searching) is entered through a form interface. This provides a huge advantage in tokenizing and analyzing the data. Through a form interface the owner of the document, who presumably knows the data well, is identifying and helping to conceptualize the data as it is entered. For example, 'Bachelor of Science' entered in an education history field indicates that the concept should be subsumed by [education] and has nothing to do with [marital status]. Form based data entry should alleviate much of the work required in tokenization, analysis, and phrase extraction. (one exception to this may be less structured data entered into a skills field) A good amount of work may still have to be done in the area of morphology.

Due to the specific nature of the data in the document base, the lexicon to be used during analysis could be built by hand. This would provide a more precise and knowledge-aware lexicon than one covering the entire English language. In building a taxonomy that indexes IC and job data, the term 'concept' may take on a more specific, and sometimes different, meaning. Since the document base contains documents only of a specific nature, concepts can be more narrowly defined and many concepts can be disregarded altogether. For example it is of no interest that [employee] may ultimately be subsumed by [mammal]. One could argue that the entire [mammal] branch of the taxonomy should be trimmed from the taxonomy when applied to the document base which is concerned with engagements and professional profiles.

The interface for querying the knowledge base is also form-based. As with the entry of such data described above, the form interface for querying the data provides a large degree oftokenization, analysis, and phrase extraction. The rules of morphology may still need to be applied. See above for more details.

Standard conceptual taxonomy searching techniques are used to find documents. Even if the term 'concept' was not defined in the traditional sense, 'conceptual neighborhoods' could still be identified to find documents having characteristics similar to the request. Smart data system 100 (including functional elements in suggestion space 100 and suggestion engine 120) can be control logic implemented in software, firmware, hardware or any combination thereof.

14. Example Network Environment

The present invention can be implemented in any communication network, such as, the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java. Java-enabled browsers are used, such as, Netscape, HotJava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description. Further, the present invention is not intended to be limited to a Web-based implementation or environment and can be implemented to be compatible with any communication network now or in the future, as would be apparent to a person skilled in the art given this description. Even further, the present invention can operate in the absence of a network, for example, on a computer not connected with a network.

Figure 9A:
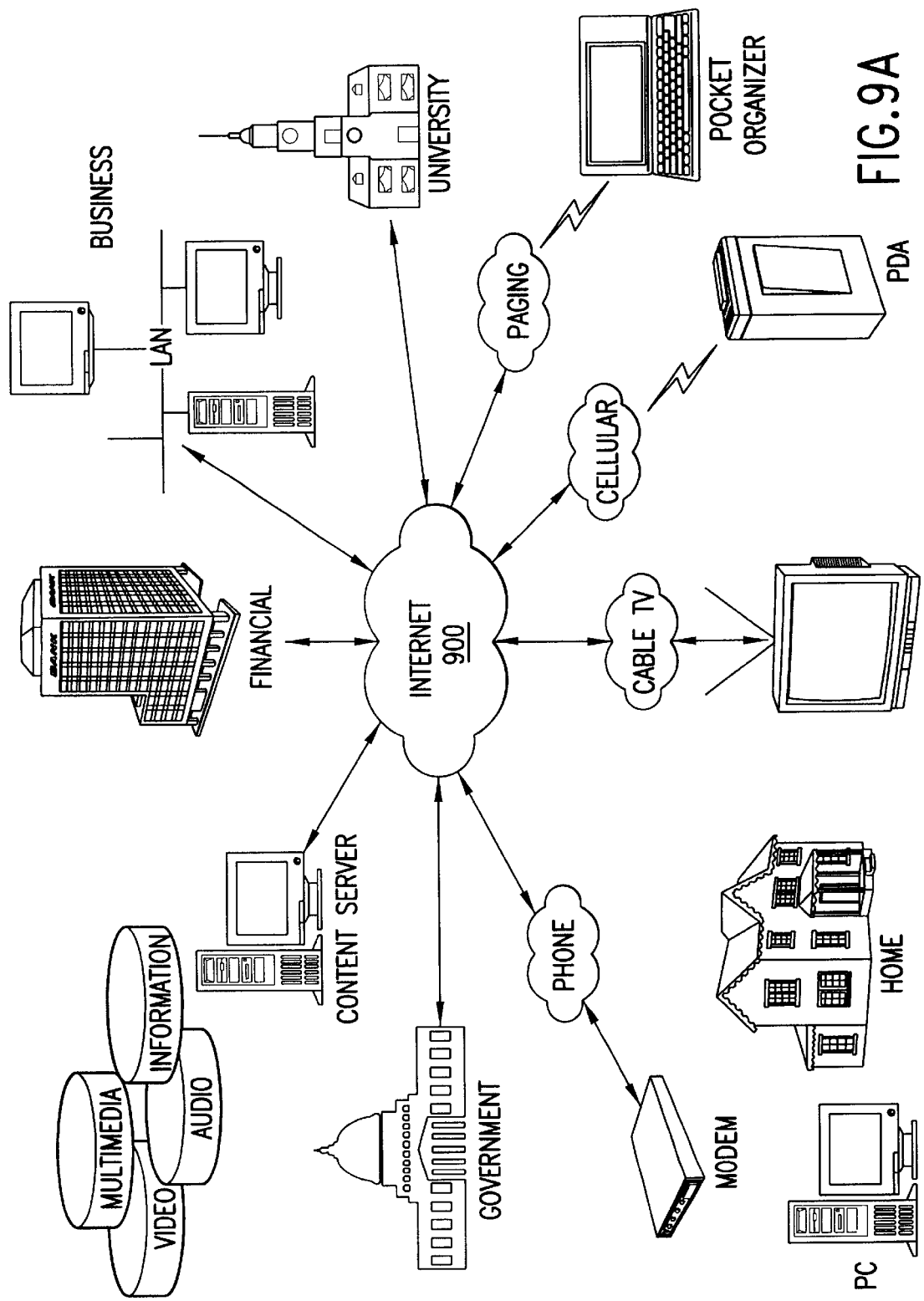
FIG. 9A is a diagram of an example internetwork environment according to the present invention.

FIG. 9A is a diagram of an example internetwork environment according to the present invention. FIG. 9A shows a communication network or combination of networks (Internet) 900 which can support the invention. Internet 900 consists of interconnected computers which supports communication between many different types of users including businesses, universities, individuals, government, and financial institutions. Internet 900 supports many different types of communication links implemented in a variety of architectures. For example, voice and data links can be used including phone, paging, cellular, and cable TV (CATV) links. Terminal equipment can include local area networks, personal computers with modems, content servers of multimedia, audio, video, and other information, pocket organizers, Personal Data Assistants (PDAs), and set-top boxes.

Figure 9B:
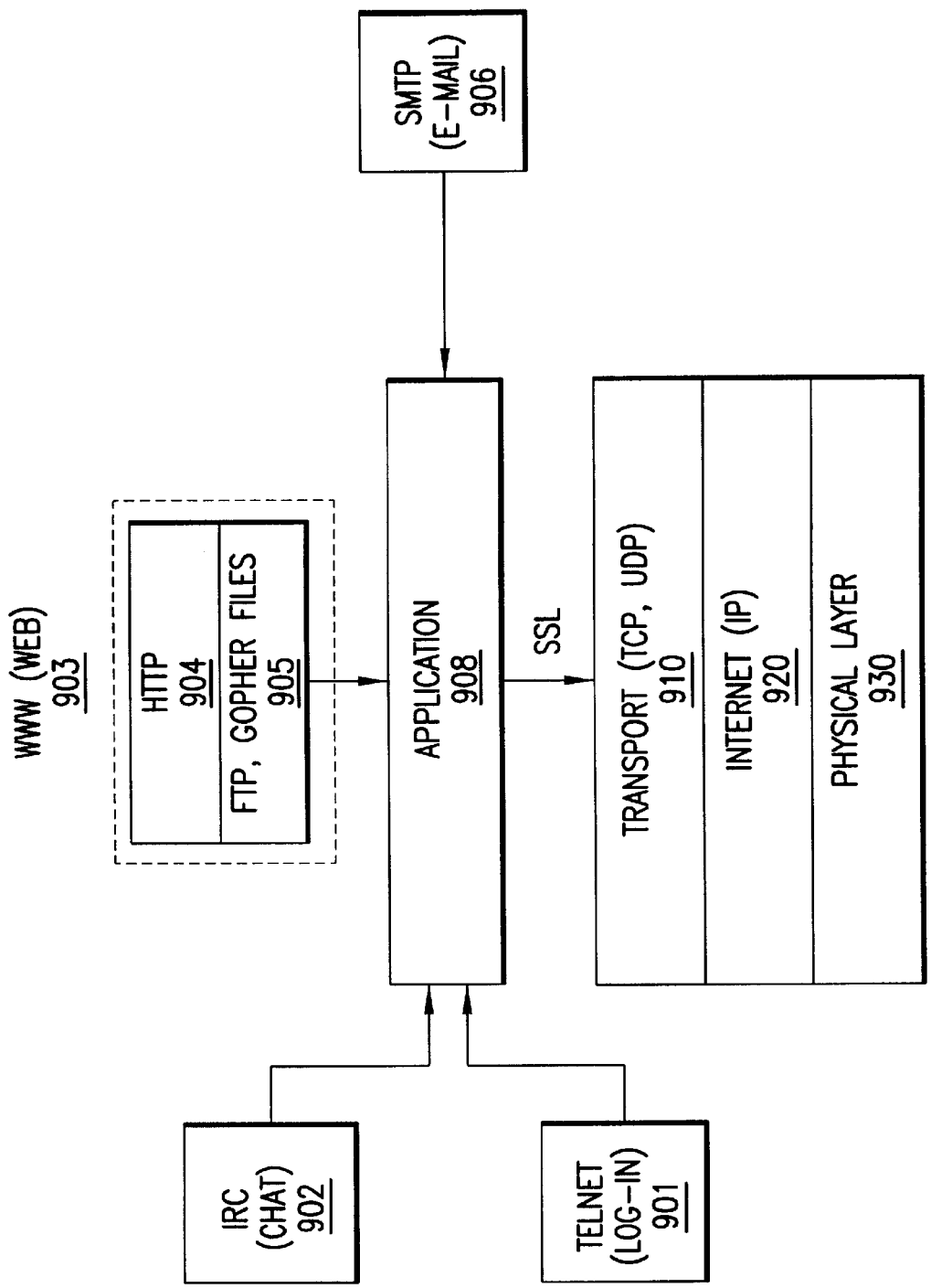
FIG. 9B shows a simplified four-layered communication model supporting Web commerce.

Communication over a communication network such as, Internet 900, is carried out through different layers of communication. FIG. 9B shows a simplified four-layered communication model supporting Web commerce including an application layer 908, transport layer 910, Internet layer 920, physical layer 930. As would be apparent to a person skilled in the art, in practice, a number of different layers can be used depending upon a particular network design and communication application. Application layer 908 represents the different tools and information services which are used to access the information over the Internet. Such tools include, but are not limited to, telenet log-in service 901, IRC chat 902, Web service 903, and SMTP (Simple Mail Transfer Protocol) electronic mail service 906. Web service 903 allows access to HTTP documents 904, and FTP and Gopher files 905. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

15. Example Computer System

Figure 9C:
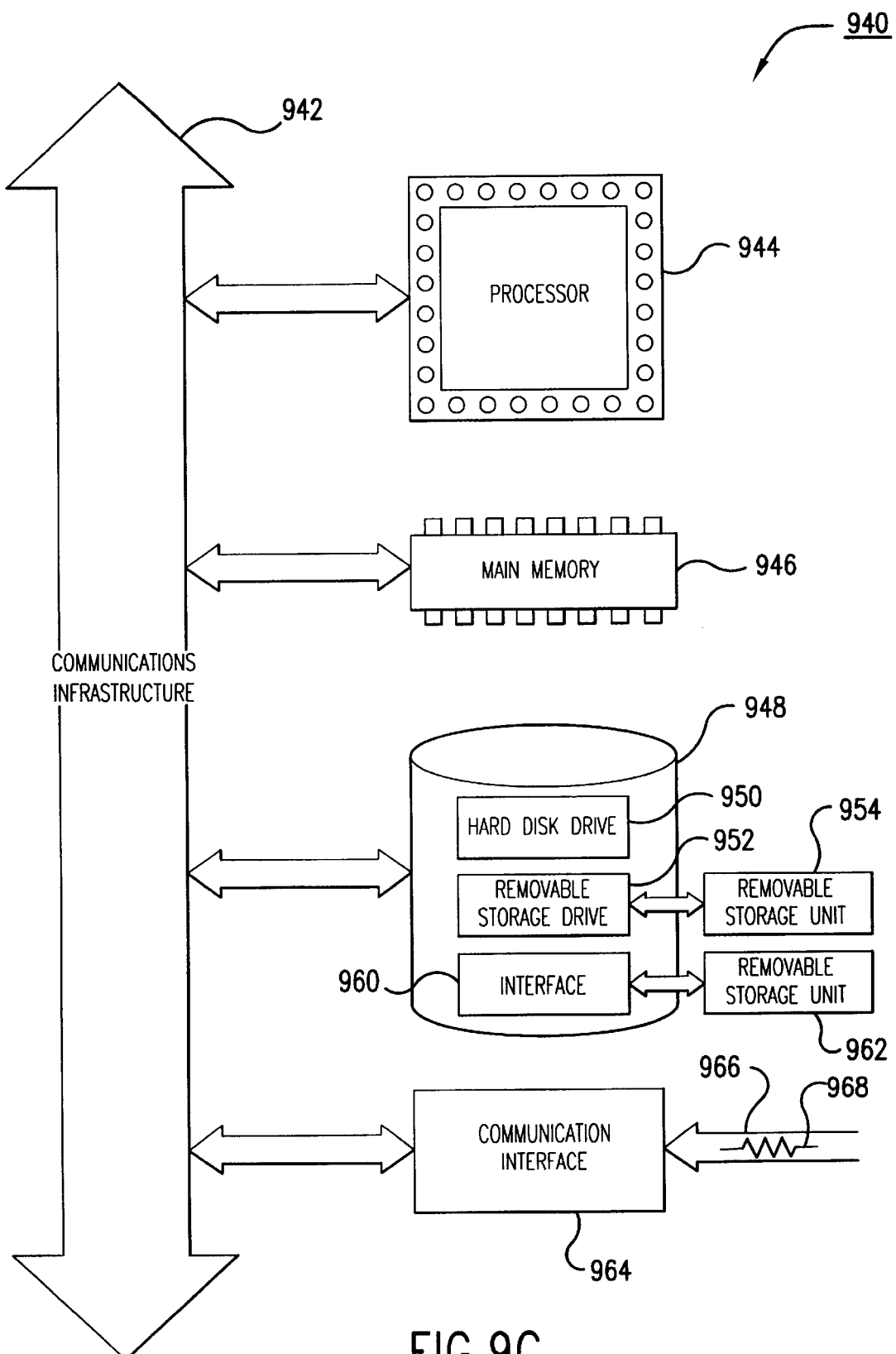
FIG. 9C is a block diagram of a computer system according to an example implementation of the present invention.

An example of a computer system 940 is shown in FIG. 9C. The computer system 940 represents any single or multi-processor computer. Single-threaded and multi-threaded computers can be used. Unified or distributed memory systems can be used.

Computer system 940 includes one or more processors, such as processor 944. One or more processors 944 can execute software implementing routine 400 as described above. Each processor 944 is connected to a communication infrastructure 942 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 940 also includes a main memory 948, preferably random access memory (RAM), and can also include a secondary memory 950. The secondary memory 950 can include, for example, a hard disk drive 952 and/or a removable storage drive 954, representing a floppy disk drive, a magnetic tape drive, an optical disk drive, etc. The removable storage drive 954 reads from and/or writes to a removable storage unit 958 in a well known manner. Removable storage unit 958 represents a floppy disk, magnetic tape, optical disk, etc., which is read by and written to by removable storage drive 954. As will be appreciated, the removable storage unit 958 includes a computer usable storage medium having stored therein computer software and/or data.

In alternative embodiments, secondary memory 960 may include other similar means for allowing computer programs or other instructions to be loaded into computer system 940. Such means can include, for example, a removable storage unit 962 and an interface 960. Examples can include a program cartridge and cartridge interface (such as that found in video game devices), a removable memory chip (such as an EPROM, or PROM) and associated socket, and other removable storage units 962 and interfaces 960 which allow software and data to be transferred from the removable storage unit 962 to computer system 940.

Computer system 940 can also include a communications interface 964. Communications interface 964 allows software and data to be transferred between computer system 940 and external devices via communications path 966. Examples of communications interface 964 can include a modem, a network interface (such as Ethernet card), a communications port, etc. Software and data transferred via communications interface 964 are in the form of signals which can be electronic, electromagnetic, optical or other signals capable of being received by communications interface 964, via communications path 966. Note that communications interface 964 provides a means by which computer system 940 can interface to a network such as the Internet.

The present invention can be implemented using software running (that is, executing) in an environment similar to that described above with respect to FIG. 9A. In this document, the term "computer program product" is used to generally refer to removable storage unit 958, a hard disk installed in hard disk drive 952, or a carrier wave carrying software over a communication path 966 (wireless link or cable) to communication interface 964. A computer useable medium can include magnetic media, optical media, or other recordable media, or media that transmits a carrier wave or other signal. These computer program products are means for providing software to computer system 940.

Computer programs (also called computer control logic) are stored in main memory 1248 and/or secondary memory 950. Computer programs can also be received via communications interface 954. Such computer programs, when executed, enable the computer system 940 to perform the features of the present invention as discussed herein. In particular, the computer programs, when executed, enable the processor 944 to perform the features of the present invention. Accordingly, such computer programs represent controllers of the computer system 940.

The present invention can be implemented as control logic in software, firmware, hardware or any combination thereof. In an embodiment where the invention is implemented using software, the software may be stored in a computer program product and loaded into computer system 1240 using removable storage drive 1254, hard drive 1250, or interface 1260. Alternatively, the computer program product may be downloaded to computer system 1240 over communications path 1266. The control logic (software), when executed by the one or more processors 1244, causes the processor(s) 1244 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

16. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for interactive, intelligent searching of data elements in a knowledge base, the knowledge base including data elements in multiple search dimensions, comprising:
   a suggestion engine; and
   a suggestion space, coupled to said suggestion engine, said suggestion space having at least one data structure representative of relationships between data elements in the knowledge base; wherein said suggestion engine interrogates the suggestion space based on received scope change-search criteria to obtain scope change search results and returns a smart tip that represents said scope change search results; whereby an executable suggestion can be provided to a user based on the smart tip.

2. The system of claim 1, wherein the search criteria indicates whether a tip for a broader or narrower search is to be generated, and wherein said suggestion engine interrogates the suggestion space looking for broader or narrower search results in accordance with the value of the received search criteria.

3. The system of claim 1, wherein the data elements in the knowledge base data include job posting and IC profile data, and wherein the smart tip includes scope change search criteria, node and search results information, whereby, the executable suggestion can be displayed to user to query the user whether a broader or narrower search is to be executed given the returned node and search results information.

4. The system of claim 1, wherein said suggestion space includes suggestion tables.

5. The system of claim 4, wherein said suggestion tables comprise at least one taxonomy.

6. The system of claim 1, wherein said suggestion space includes suggestion tables stored in the knowledge base and an in-memory suggestion space stored in memory, said in-memory suggestion space representing a copy of at least a portion of said suggestion tables.

7. The system of claim 6, wherein said suggestion space includes:

a suggestion space populator; and a suggestion space updater, said suggestion space populator and said suggestion space updater each being coupled between said suggestion tables and said in-memory suggestion space.

8. The system of claim 4, further comprising a suggestion structure builder coupled between the knowledge base and the suggestion tables, said suggestion structure builder receiving an input from a knowledge expert and generating an output to modify the suggestion tables in accordance with the received Jun. 27, 2002 input.

9. The system of claim 4, further comprising a knowledge base suggestion mapper coupled between the knowledge base and the suggestion tables to map data in the knowledge base to a corresponding location in the suggestion tables.

10. The system of claim 1, further comprising:

a query builder, coupled to said suggestion engine;

a tip formatter;

a tip interface, coupled between said tip formatter and said suggestion engine;

a smart domain module Jun. 27, 2002;

a searchable interface coupled between said suggestion engine and said smart domain module.

11. A method for interactive searching, comprising the steps of:

receiving a search query;

identifying at least one parameter in the search query that corresponds to a dimension in a suggestion space;

interrogating the suggestion space to determine scope change search results based on a scope change search criteria; and creating a smart tip that represents the scope change search results; whereby an executable suggestion can be provided to a user based on the smart tip.

12. The method of claim 11, wherein the scope change search criteria indicates whether a tip for a broader or narrower search is to be generated, and wherein said interrogating step interrogates the suggestion space looking for broader or narrower search results in accordance with the value of the scope change search criteria.

* * * * *

UNITED STATES PATENT AND TRADEMARK OFFICE
CERTIFICATE OF CORRECTION

PATENT NO.     : 6,578,022 B1
DATED          : June 10, 2003
INVENTOR(S)    : Foulger et al.

It is certified that error appears in the above-identified patent and that said Letters Patent is hereby corrected as shown below:

Title page,
Item [56], References Cited, OTHER PUBLICATIONS, please insert the following citations:
-- Gauch, S. and Smith, J.B., "Query Reformulation Strategies for an Intelligent Search Intermediary," *Proceedings of the AI Systems in Government Conference,* IEEE Computer Society, ISBN No. 0-8186-1934-1, pp. 65-71 (March 27-31, 1989). International Search Report from PCT Application Serial No. PCT/US01/12510, filed April 18, 2001, 6 pages (Search Report mailed September 5, 2002). --

Column 26,
Line 37, please replace "ofdata" with -- of data --.
Line 46, please replace "change-search" with -- change search --.

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,578,022 B1
DATED        : June 10, 2003
INVENTOR(S)  : Foulger et al.

It is certified that error appears in the above-identified patent and that said Letters Patent is hereby corrected as shown below:

Column 27,
Line 18, please replace "June. 27, 2002".

Column 28,
Line 3, please replace "June. 27, 2002".

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,578,022 B1
DATED         : June 10, 2003
INVENTOR(S)   : Foulger et al.

It is certified that error appears in the above-identified patent and that said Letters Patent is hereby corrected as shown below:

Column 27,
Line 18, please delete "June. 27, 2002".

Column 28,
Line 3, please delete "June. 27, 2002".

This certificate supersedes Certificate of Correction issued April 20, 2004.

Signed and Sealed this

Nineteenth Day of October, 2004

JON W. DUDAS
*Director of the United States Patent and Trademark Office*